United States Patent [19]
Harris

[11] Patent Number: 5,687,778
[45] Date of Patent: Nov. 18, 1997

[54] DUAL VALVE TANK VENTING SYSTEM

[75] Inventor: Robert S. Harris, Connersville, Ind.

[73] Assignee: Stant Manufacturing Inc., Connersville, Ind.

[21] Appl. No.: 432,600

[22] Filed: May 1, 1995

[51] Int. Cl.$^6$ ............................................. B65B 1/04
[52] U.S. Cl. ..................... 141/59; 141/290; 137/43
[58] Field of Search ........................... 141/59, 285, 286, 141/290, 198; 137/43, 202, 587, 493.9, 493.6; 220/86.2; 123/519

[56] References Cited

U.S. PATENT DOCUMENTS

| | | |
|---|---|---|
| 4,760,858 | 8/1988 | Szlaga . |
| 4,770,677 | 9/1988 | Harris . |
| 4,816,045 | 3/1989 | Szlaga et al. . |
| 4,836,835 | 6/1989 | Harris et al. . |
| 4,944,779 | 7/1990 | Szlaga et al. . |
| 4,974,645 | 12/1990 | Johnson ................................ 141/198 |
| 4,991,615 | 2/1991 | Szlaga et al. . |
| 5,028,244 | 7/1991 | Szlaga . |
| 5,156,178 | 10/1992 | Harris . |
| 5,277,168 | 1/1994 | Kondo et al. . |
| 5,392,804 | 2/1995 | Kondo et al. ............................ 137/43 |
| 5,404,906 | 4/1995 | Aoshima et al. ....................... 220/86.2 |
| 5,449,029 | 9/1995 | Harris ................................... 220/86.2 |
| 5,474,048 | 12/1995 | Yamazaki et al. ..................... 220/86.2 |
| 5,518,018 | 5/1996 | Roetker ................................. 137/43 |

*Primary Examiner*—Henry J. Recla
*Assistant Examiner*—Steven O. Douglas
*Attorney, Agent, or Firm*—Barnes & Thornburg

[57] ABSTRACT

A tank venting system includes a first vent apparatus mounted on a top wall of a fuel tank, a second vent apparatus mounted on a raised top wall of a vapor dome on the fuel tank to lie in diagonally spaced-apart relation to the first vent apparatus, a fuel vapor conduit conducting fuel vapor discharged from the first and second vent apparatus to a vapor-recovery canister, and a nozzle shut-off tube having an inlet end extending through an aperture formed in the raised top wall of the vapor dome and an outlet end coupled to a fuel tank filler neck. The inlet end of the nozzle shut-off tube is configured to sense liquid fuel levels in the fuel tank.

40 Claims, 6 Drawing Sheets

DUAL VALVE TANK VENTING SYSTEM

This invention relates to systems for controlling venting of fuel vapors from a vehicle fuel tank, and particularly to a dual valve tank venting system. More particularly, this invention relates to a tank venting system including a pair of spaced-apart, tank-mounted tank venting control valves arranged to vent fuel vapor from various regions inside a vehicle fuel tank to a vapor-recovery canister or other destination.

It is well understood that significant quantities of fuel vapor can escape from a fuel tank through the filler neck to the atmosphere during the refueling of motor vehicles. Early attempts to control the vapor escape focused upon control devices fitted to a fuel-dispensing pump nozzle connected to a service station fuel pump. Later, control devices mounted directly on-board the vehicle were developed. See, for example, U.S. Pat. No. 4,816,045 to Szlaga et al., relating to a vapor-recovery system mounted on the fuel tank filler neck. Tank venting systems which mount to a fuel tank have also been developed as shown, for example, in U.S. Pat. No. 5,156,178 to Harris.

In addition to controlling vapor escape, well-designed tank venting systems also assist in controlling the amount of liquid fuel which can be pumped into the fuel tank during refueling. For safety reasons, fuel systems are designed so that the fuel tank is never completely filled with liquid fuel. Rather, at least a predetermined portion of the space inside the fuel tank is left for liquid fuel and fuel vapor expansion. Although fuel pump nozzles typically include sensors for shutting off the flow of liquid fuel into the fuel tank when the fuel tank is nearly filled, fuel pump users may manually override the sensors by continuing to pump fuel after the sensors have automatically and temporarily shut the pump nozzle off. To assist in preventing tank overfill under such conditions, a tank venting system is usually provided with a "fill-limit" control system which assists in triggering the nozzle shut-off mechanism when the level of liquid fuel in the fuel tank has risen to a predetermined level. See, for example, the fill-limit control system disclosed in U.S. Pat. No. 4,816,045 to Szlaga et al.

It has also long been recognized that fuel vapor is generated in the fuel tank during operation of the vehicle, for example, by evaporation or by sloshing of the liquid fuel against the walls of the tank. Excessive pressure can build up in the fuel tank as a result of the newly formed fuel vapor unless control devices are provided to vent the fuel vapor from the fuel tank during vehicle operation. Such valves have been referred to as "run-loss" valves or tank venting rollover valves because they handle fuel vapor loss during vehicle run and are capable of preventing liquid fuel carry-over during vehicle rollover.

What is needed is a system for venting pressurized fuel vapor from a tank to a vapor-recovery device or other destination even when the tank is inclined (e.g., on a grade) and filled to capacity with liquid fuel. Vehicle fuel tanks are oriented on grades in inclined positions with respect to a level plane if the vehicle carrying the fuel tank is driven over a hilly or banked road or is parked facing upwardly or downwardly on an inclined or banked street. It will be understood that a vehicle fuel tank could be pivoted about a longitudinal axis extending through the fuel tank and along the length of the vehicle carrying the fuel tank so as to incline the fuel tank any time the vehicle is driven over or parked on an inclined road. It will also be understood that a vehicle fuel tank could be pivoted about a transverse axis extending through the fuel tank and across the width of the vehicle carrying the fuel tank so as to incline the fuel tank any time the vehicle is driven along a banked road or parked in a "side-hill-lie position" on a banked road or parking lot.

One potential problem with a tank carrying a single tank venting valve is that the valve could be immersed in liquid fuel temporarily or for long periods of time if the vehicle carrying the tank and valve is driven over or parked on an inclined or banked road (i.e., a graded surface) and thus unable to "reach or communicate with" and vent pressurized fuel vapor otherwise located within the tank to a vapor-recovery canister or other destination outside the tank. What is needed is a tank venting system that is configured to provide "grade venting" and, as such, is not hampered or disabled by sloshing or pooling liquid fuel in a moving, inclining, or otherwise tilting vehicle fuel tank.

Consumers would welcome such a tank venting system that was also operable to relieve vacuum conditions that develop in a tank and prevent tank overfilling during refueling. System costs could be minimized if such a system could be configured to vent pressurized fuel vapor from the tank to a vapor-recovery canister without using a separate fuel vapor-venting control valve in addition to the tank-mounted vent valves.

Fuel pump nozzles are known to include a fill-limiting sensor for shutting off the flow of fuel from the nozzle when the fuel tank is nearly filled. Typically, this fill-limiting sensor is triggered whenever the fuel tank is full and fuel "backs up" the filler neck to splash onto or reach the fill-limiting sensor located on the nozzle. Sometimes fuel pump operators overfill a fuel tank inadvertently in a good-faith effort to fill the tank "completely" or to purchase a quantity of fuel that can be paid for in cash without causing the operator to receive unwanted coinage in change.

It has been observed that fuel pump operators are able to manually override or bypass some fill-limiting sensors on nozzles by continuing to pump fuel after the pump nozzle has automatically shut off several times. This practice has come to be called the "trickle-fill" method of introducing liquid fuel into a fuel tank. Using this well-known trickle-fill method, the fuel pump operator "clicks" or squeezes the lever handle on the pump nozzle slowly two or three times in succession after automatic nozzle shut-off has occurred in order to introduce more fuel into the fuel tank without actuating the fill-limiting sensor right away. It will be appreciated that such trickle-fill practices can result in overfilling the fuel tank which can effectively reduce the fuel vapor expansion capacity in the vapor space available within the filled fuel tank.

Vehicle fuel systems are known to include valves for venting the vapor space in a fuel tank. See, for example, U.S. Pat. Nos. 4,760,858; 4,991,615; and 5,028,244.

What is also needed is a multi-valve fill-limit and tank ventilation control system that is able to provide grade venting for an inclined or tilted fuel tank and to vent fuel vapor from the vapor space in a fuel tank during early stages of refueling but block introduction of any and all liquid fuel in excess of a maximum volume so as to preserve a minimum volume of the vapor space in the fuel tank once the fuel tank is filled to its maximum capacity with fuel. In addition, a multi-valve fill-limit control system that is adaptable to provide grade venting and to permit customers some latitude to trickle-fill their fuel tanks without overfilling the fuel tanks would be welcomed by fuel customers and vehicle makers.

According to the present invention, a tank venting system includes a tank, a first vent apparatus coupled to the tank, a vapor dome on top of the tank, and a second vent apparatus coupled to the vapor dome. The tank is formed to include an interior region and a bottom wall underlying the top wall and defining a floor of the interior region.

The vapor dome is positioned to rise vertically above the top wall of the underlying tank. The vapor dome is formed to include a vapor-receiving space communicating with the underlying interior region of the tank to receive fuel vapor generated by liquid fuel contained in the interior region of the tank. The vapor dome includes a raised top wall defining a ceiling of the vapor-receiving space and lying at a first elevation vertically above the adjacent top wall of the tank so that the top wall of the tank lies at a second elevation that is vertically above the bottom wall of the tank and vertically below the elevation of the raised top wall for the vapor dome.

The first vent apparatus is mounted on the top wall of the tank to vent the interior region of the tank. The second vent apparatus is mounted on the raised top wall of the vapor dome to vent the vapor-receiving space of the vapor dome. The first and second vent apparatus are arranged in spaced-apart relation so that one vent apparatus is able to vent pressurized fuel vapor from the interior region of the tank even if the other vent apparatus is immersed temporarily or for a long period of time in liquid fuel contained in the tank.

In preferred embodiments, the system further includes a fuel vapor conduit interconnecting fuel vapor discharge outlets of the first and second vent apparatus and conducting fuel vapor discharged from the first and second vent apparatus directly to a vapor-recovery canister without passing through any separate external fuel vapor control valve. The system also includes a nozzle shut-off tube extending into the vapor-receiving space in the vapor dome through an aperture formed in the raised top wall of the vapor dome and operating to shut off a fuel-dispensing pump nozzle at the proper time during refueling once the tank has been filled to capacity with liquid fuel.

Illustratively, the first vent apparatus is a high flow float valve that moves from a normally open position to a closed position in response to either high liquid fuel levels in the tank or vehicle rollover. During refueling, the float valve will move to its closed position once the crest of the liquid fuel level in the tank reaches or nearly reaches the top wall of the tank (e.g., the level of liquid fuel in the fuel tank reaches 90% full level). At that point, pressurized fuel vapor extant in the vapor-receiving space of the vapor dome and located above liquid fuel in the tank underlying the vapor dome can vent to the vapor-recovery canister through the second vent apparatus mounted in the raised top wall of the vapor dome.

Illustratively, the second vent apparatus includes a venting control module regulating flow of fuel vapor from the vapor-receiving space of the vapor dome to the vapor-recovery canister. In preferred embodiments, the venting control module includes a spring-loaded pressure-relief valve, a spring-loaded vacuum-relief valve, and a motion-actuated ball-type head valve covering a venting aperture formed in the vacuum-relief valve. Further, a second vent apparatus also includes a rollover valve assembly for blocking discharge of liquid fuel and fuel vapor from the vapor dome during vehicle rollover.

In use, if the first vent apparatus closes upon exposure to liquid fuel because the tank becomes inclined or tilted with respect to a level horizontal plane, then pressurized fuel vapor in the vapor dome can still be vented through the second vent apparatus. Likewise, if the vapor-receiving space in the vapor dome becomes filled with liquid fuel due to inclining or tilting of the tank causing the second vent apparatus to close, then pressurized fuel vapor extant in the interior region of the tank communicating with the first vent apparatus can still be vented through the first vent apparatus. Ideally, the first and second vent apparatus are mounted in diagonally spaced-apart relation on opposite sides of a reference line longitudinally bisecting the top wall of the tank and the raised top wall of the vapor dome and extending across the width of the vehicle carrying the tank. This placement helps to ensure that the tank can be vented through either the first or second vent apparatus even when a vehicle carrying the tank is driven over a banked road or parked in a side-hill-lie position on a banked road or parking lot.

Also according to the present invention, a tank venting system includes a fuel tank, a first vent apparatus coupled to the fuel tank to vent an interior region of the fuel tank, and a second vent apparatus coupled to the fuel tank to vent the interior region of the fuel tank. Means is provided in the first vent apparatus for blocking flow of pressurized fuel vapor from the interior region of the fuel tank through the first vent apparatus once the volume of liquid fuel in the interior region of the fuel tank is at least 90% of a predetermined liquid fuel capacity of the interior region of the fuel tank. Thus, any further venting of pressurized fuel vapor from the interior region of the fuel tank is regulated by a flow control valve provided in the second vent apparatus.

In use, the blocking means in the first vent apparatus operates to shut off any fuel vapor discharge from the fuel tank through the first vent apparatus once the level of liquid fuel in the fuel tank reaches the 90% full level, before the first automatic nozzle shut-off occurs. Thus, when trickle-fill is attempted by a pump operator, only one of the two vent apparatus is able to discharge pressurized fuel vapor from the fuel tank. This minimizes any trickle-fill problem that might otherwise exist by providing two or more vent apparatus to accomplish grade venting.

Provision of two or more vent apparatus on a fuel tank is desirable because it can be used in accordance with the present invention to establish a grade venting system of the type described. However, the use of two or more such vent apparatus in a fuel tank to provide grade venting could increase the potential for trickle-fill by increasing the venting capacity of the tank venting control system, thereby allowing relatively fast trickle-filling. In accordance with the present invention, a first of the two vent apparatus mounted on the fuel tank is positioned and configured so that it is closed automatically when the level of liquid fuel in the fuel tank reaches, for example, the 90% full level, before the first automatic nozzle shut-off. In this way, only the second vent apparatus is operating when the level of liquid fuel in the fuel tank reaches the 100% full level and trickle-fill techniques, if unchecked or minimized, could result in overfilling the fuel tank. Illustratively, a buoyant float valve is provided in the first vent apparatus and the rising level of liquid fuel in the fuel tank floats the buoyant float valve to its closed position when the fuel tank is about 90% full of liquid fuel. Further, other valving is provided in the second vent apparatus to control trickle-fill practices during refueling.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIGS. 9–11 show the dual valve tank venting system of FIG. 1 during tank refueling;

FIG. 11a is a view similar to FIG. 10a showing floatation of the closure valve or liquid fuel in the tank to a raised position closing the inlet end of the nozzle shut-off tube;

DETAILED DESCRIPTION OF THE DRAWINGS

Figure 1:
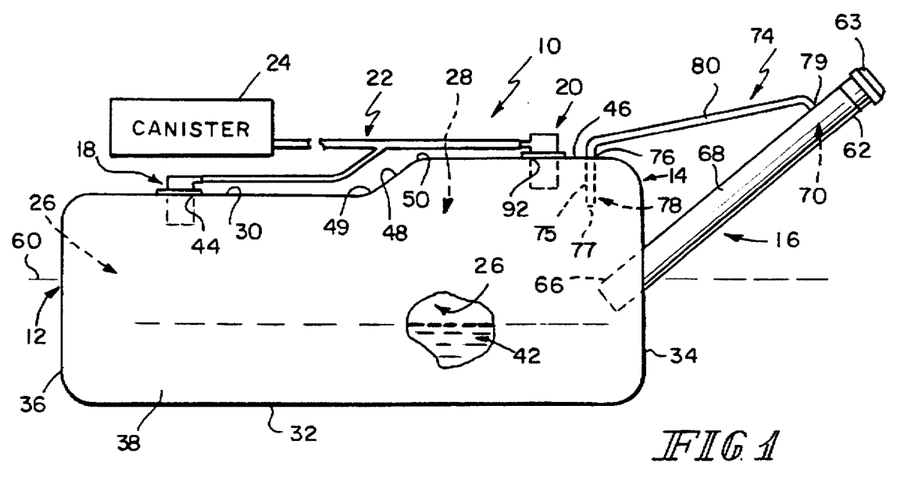
FIG. 1 is a diagrammatic illustration of a dual valve tank venting system in accordance with the present invention coupled to a fuel tank/and a vapor dome on the fuel tank, the system including a first vent apparatus mounted on a top wall of the fuel tank, a second vent apparatus mounted on a raised top wall of the vapor dome, a fuel vapor conduit conducting fuel vapor discharged from the first and second vent apparatus to a vapor-recovery canister, and a nozzle shut-off tube having an inlet end extending through an aperture formed in the raised top wall of the vapor dome and an outlet end coupled to a fuel tank filler neck.

An illustration of a tank venting system 10 in accordance with the present invention is shown in FIG. 1. Tank venting system 10 includes a tank 12, a vapor dome 14 on the tank, a filler neck 16 coupled to the tank 12, a first vent apparatus 18 coupled to the tank 12, and a second vent apparatus 20 coupled to the vapor dome 14. A fuel vapor conduit 22 conducts pressurized fuel vapor discharged from each of the first and second vent apparatus 18, 20 to a vapor-recovery canister 24 or other destination on-board the vehicle (not shown) carrying tank 12. First vent apparatus 18 functions to vent excess fuel vapor pressure from an interior region 26 of tank 12. Second vent apparatus functions to vent excess fuel vapor pressure from a vapor-receiving space 28 of vapor dome 14 when tank pressure is too high, admit atmospheric air into vapor-receiving space 28 when tank pressure is too low, and vent some fuel vapor pressure from vapor-receiving space 28 when the vehicle carrying tank 12 is in motion.

Figure 2:
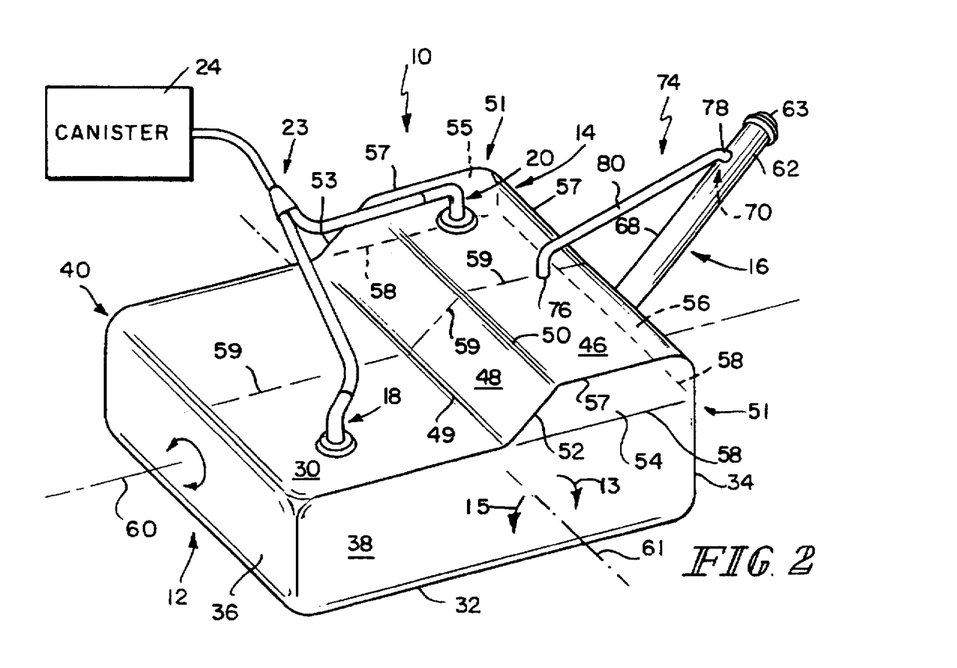
FIG. 2 is a perspective view of the tank diagrammatically illustrated in FIG. 1 showing a presently preferred diagonally spaced-apart mounting position of the first and second vent apparatus on the fuel tank and the vapor dome.

As shown in FIGS. 1 and 2, tank 12 includes a top wall 30, a first end wall 34 coupled to filler neck 16, an opposite, spaced-apart second end wall 36, a first side wall 38 extending longitudinally between first and second end walls 34, 36, and a second side wall 40 extending longitudinally between the first and second end walls 34, 36 and lying in spaced-apart relation to first side wall 38. Top wall 30, bottom wall 32, first and second end walls 34, 36, and first and second side walls 38, 40 cooperate to define interior region 26 of tank 12. Interior region 26 is configured to hold a volatile liquid fuel 42 that flows into tank 12 through filler neck 16 during refueling and is capable of producing fuel vapor.

First vent apparatus 18 is mounted preferably in an aperture 44 formed in top wall 30 and arranged to vent pressurized fuel vapor from interior region 26 of tank 12 to vapor-recovery canister 24 as shown, for example, in FIGS. 1 and 2. It is within the scope of this invention to position first vent apparatus 18 so that an inlet opening therein communicates with interior region 26 of tank 12 in a suitable location near top wall 30 of tank 12 without necessarily mounting vent apparatus 18 in an aperture formed in top wall 30 of tank 12.

As also shown in FIGS. 1 and 2, vapor dome 14 includes a raised top wall 46, an inclined side wall 48 having a vertically lower edge 49 appended to top wall 30 of tank 12 and a vertically higher edge 50 appended to raised top wall 46 of vapor dome 14, and a U-shaped (in plan) side wall 51. Inclined side wall 48 includes a first end edge 52 between lower and higher edges 49, 50 and an opposite second end edge 53 between lower and higher edges 49, 50 as shown best in FIG. 2. U-shaped side wall 51 includes a first end portion 54 appended to first end edge 52 of inclined side wall 48, a second edge portion 55 appended to second end edge 53 of inclined side wall 48, and an upright side wall 56 interconnecting first and second end portions 54, 55. U-shaped side wall 51 also includes a U-shaped upper perimeter edge 57 appended to raised top wall 46 of vapor dome 14 and a lower perimeter edge 58 appended to tank 12 as shown, for example, in FIG. 2.

Although the description of tank venting system 10 thus far has made reference to a tank 12 and a vapor dome 14, it will be understood that tank venting system 10 preferably comprises a unitary fuel tank unit including tank 12 and vapor dome 14. As shown best in FIG. 2, this unitary fuel tank unit 12, 14 includes a tiered top wall and first vent apparatus 18 is mounted in a lower tier 30 of the tiered top wall and second vent apparatus 20 is mounted in an upper tier 46 of the tiered top wall.

Preferably, first and second vent apparatus 18, 20 are mounted on the tiered top wall of the unitary fuel tank unit 12, 14 to lie in diagonally spaced-apart relation on opposite sides of a reference line 59 (in phantom) longitudinally bisecting top wall 30 of tank 12 and raised top wall 46 of vapor dome 14 as shown in FIG. 2. This placement of first and second vent apparatus 18, 20 will enhance venting of fuel vapors from the unitary fuel tank unit 12, 14 in the event that tank unit 12, 14 is tilted in either a clockwise or counterclockwise direction about longitudinal axis 60 shown in FIG. 2 due to inclination of a vehicle (not shown) carrying tank unit 12, 14 on a graded surface. Likewise, placement of first and second vent apparatus 18, 20 on opposite sides of transverse axis 61 as shown in FIG. 2 will enhance venting of fuel vapors from unitary tank unit 12, 14 in the event that tank unit 12, 14 is tilted in either a clockwise or counterclockwise direction about transverse axis 61 as shown, for example, in FIGS. 12 and 13.

A filler neck 16 is shown extending upwardly and outwardly from first end wall 34 of tank 12 in FIG. 1. Filler neck 16 includes an outer filler end 62 that is configured to carry a removable fuel cap 63 and to receive fuel supplied by a fuel-dispensing nozzle 64. Filler neck 16 further includes an inner end 66 that joins first end wall 34 to provide fluid communication between filler neck 16 and the tank 12 and a fill tube 68 interconnecting outer filler end 62 and inner end 66.

Figures 9, 9A:
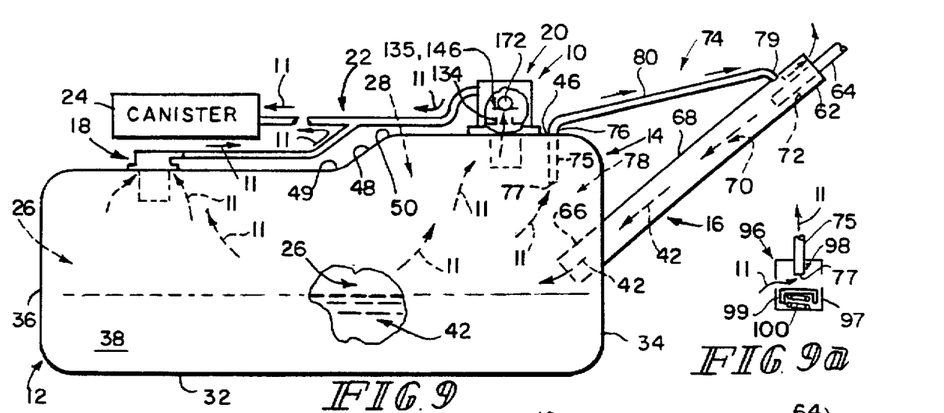
FIG. 9 shows fuel vapor venting from the interior region of the tank to the vapor-recovery canister through the first vent apparatus and from the vapor-receiving space in the vapor dome to the vapor-recovery canister through the second vent apparatus as liquid fuel is dispensed into a nearly empty tank through a filler neck.
FIG. 9a is a diagrammatic view of an embodiment of a liquid fuel-actuated closure mechanism mounted to the inlet end of the nozzle shut-off tube of FIG. 9 showing a closure valve in an opened position.

Filler neck 16 is formed to include a fuel nozzle chamber 70 in outer end 62 as shown, for example, in FIGS. 1 and 9. Fuel nozzle chamber 70 is bounded at its axially outer end by, for example, a partition 72 extending across the width of a nozzle-receiving passageway in outer end and providing (in a nozzle-receiving aperture formed therein) a suitable nozzle-engaging liquid fuel and fuel vapor seal. Fuel nozzle chamber 70 is bounded at its side by an inner wall of outer end 62. The axially inner portion of fuel nozzle chamber 70 communicates with fill tube 68.

A nozzle shut-off tube 74 interconnects vapor-receiving space 28 of vapor dome 14 and fuel nozzle chamber 70 of filler neck 16 as shown, for example, in FIGS. 1, 2, and 9. As shown, for example, in FIGS. 1 and 9–11, nozzle shut-off tube 74 includes an inlet end 75 passing through an aperture 76 formed in raised top wall 46 of vapor dome 14 and terminating at an open mouth 77 positioned to lie in a region 78 near an imaginary planar boundary between vapor-receiving space 28 of vapor dome 14 and the underlying interior region 26 of tank 12. Nozzle shut-off tube 74 also includes an outlet end 79 coupled to fuel nozzle chamber 70 in filler neck 16 and an extension portion 80 interconnecting inlet and outlet ends 75, 79 in fluid communication and extending between vapor dome 14 and filler neck 16.

Nozzle shut-off tube 74 functions to communicate fuel vapor from tank unit 12, 14 to fuel nozzle chamber 70 in filler neck 16 until open mouth 77 of inlet end 75 is immersed in liquid fuel 42 contained in tank unit 12, 14. Once such immersion occurs, often as soon as the tank unit 12, 14 is filled to its rated capacity with liquid fuel during refueling, a vacuum develops in fuel nozzle chamber 70 causing a conventional vacuum sensor (not shown) on fuel-dispensing nozzle 64 to shut off further discharge of liquid fuel from fuel-dispensing nozzle 64 into filler neck 16 automatically.

In operation, normally open first vent apparatus 18 permits generally unrestricted venting of pressurized fuel vapor from interior region 26 of tank 12 to vapor-recovery canister 24 through fuel vapor conduit 22 unless a vehicle (not shown) carrying tank unit 12, 14 rolls over. Second vent apparatus 20 operates to permit fuel vapor to be vented from vapor-receiving space 28 in vapor dome 14 to vapor-recovery canister 24 through a venting outlet 35 formed in second vent apparatus 20 when tank pressure exceeds a predetermined "maximum pressure" level. It also operates to permit fuel vapor from vapor-recovery canister 24 or ambient air from the atmosphere outside second vent apparatus 20 to enter tank unit 12, 14 to relieve unwanted vacuum conditions extant in tank unit 12, 14. When the vehicle (not shown) carrying tank unit 12, 14 is in motion, second vent apparatus 20 permits generally unrestricted venting of fuel vapor from tank unit 12, 14 to diminish tank pressure somewhat, even though the tank pressure has not exceeded the predetermined maximum pressure level. In addition, second vent apparatus 20 is configured to maintain a preselected pressure, or "pressure head" within the tank unit 12, 14 when the vehicle is stationary. This preselected pressure head advantageously aids in preventing overfilling of tank unit 12, 14 during the fuel-filling operation.

Figures 3, 4:
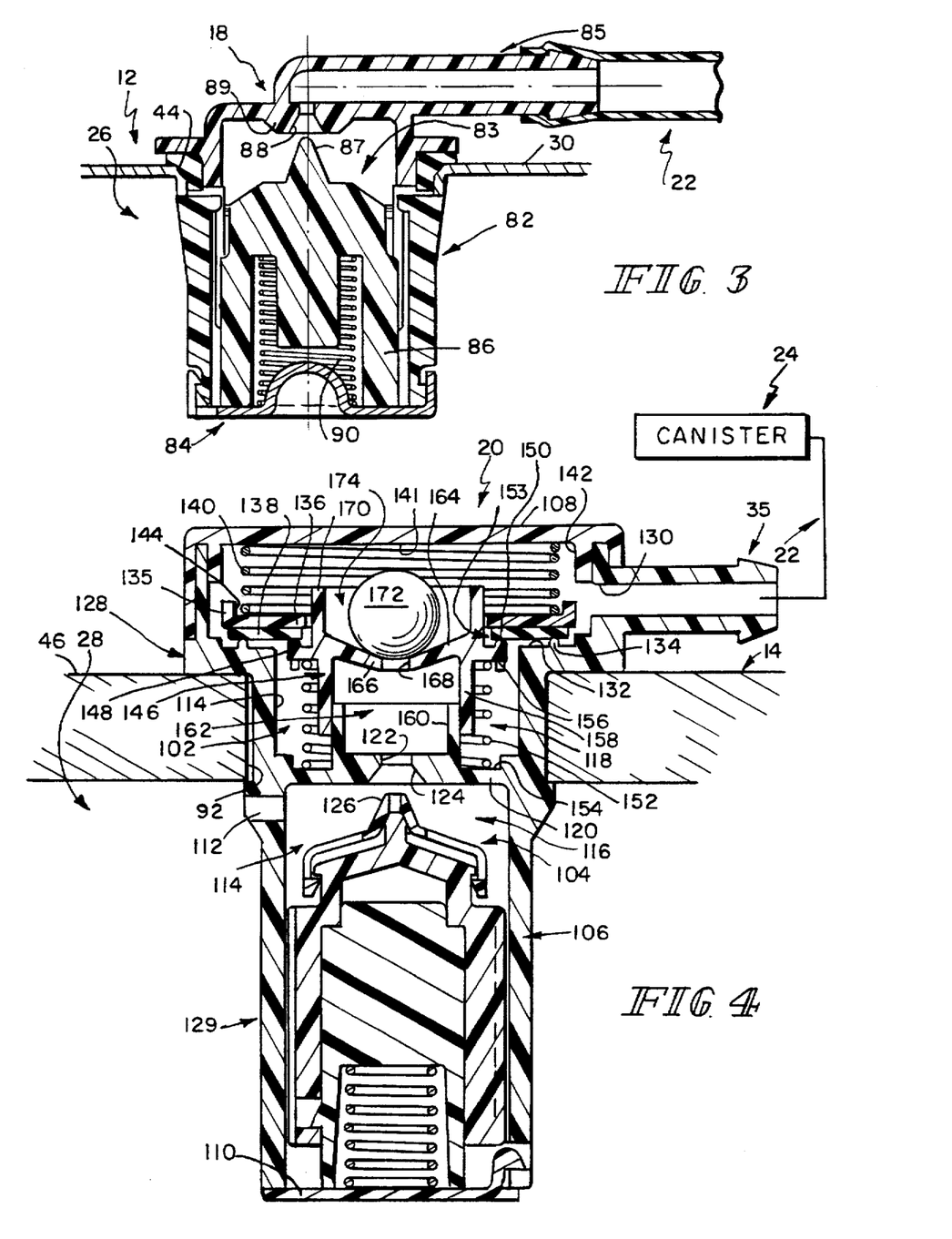
FIG. 3 is a sectional detail view of the first vent apparatus of FIG. 1 showing a float-type rollover valve in a housing mounted in an aperture formed in the top wall of the tank.
FIG. 4 is a sectional detail view of the second vent apparatus of FIG. 1 showing a lower chamber containing a rollover valve, an upper chamber communicating with a side-discharge venting outlet and containing a spring-loaded annular pressure-relief valve normally closing a large aperture formed in the valve housing, a spring-loaded vacuum-relief valve normally closing a central aperture formed in the pressure-relief valve, a head valve cage appended to the vacuum-relief valve and positioned to extend through the central aperture in the pressure-relief valve, and a movable ball-type head valve in the head valve cage.

A presently preferred embodiment of first vent apparatus 18 is shown in FIG. 3. First vent apparatus 18 includes a housing 82 mounted in aperture 44 formed in top wall 30 of tank 12 and a movable flow control valve 83 inside housing 82. Housing 82 is formed to include a fuel vapor inlet 84 located in interior region 26 of tank 12 and a fuel vapor outlet 85 located outside interior region 26 of tank 12. Fuel vapor inlet 84 should communicate with interior region 26 of tank 12 even though housing 82 is mounted in a position other than in aperture 44 formed in top wall 30 of tank 12. Movable flow control valve 83 is a rollover valve assembly that functions to provide means for blocking flow of liquid fuel and fuel vapor through first vent apparatus 18 when the vehicle fuel tank unit 12, 14 rolls over or experiences a change in attitude in excess of a predetermined amount.

Movable flow control valve 83 includes a float 86 carrying a nipple 87 configured to seat against a conical valve seat 88 formed on a partition 89 in housing 82 to prevent the flow of liquid fuel and fuel vapor through fuel vapor outlet 85 during tilting of tank unit 12, 14 in excess of a predetermined amount. Movable flow control valve 83 also includes a coiled compression spring 90 biasing float 86 and nipple 87 toward conical valve seat 88 as shown in FIG. 3. Changes in tank unit 12, 14 attitude in excess of a predetermined amount cause flow control valve 83 to move in housing 82 to place nipple 87 in engagement with conical valve seat 88, thereby closing fuel vapor outlet 85. It will be understood that other types of rollover valves, including float valves, inertial ball-and-ramp valves, and others, may be used in accordance with the invention to provide suitable rollover closure.

A tank venting control assembly 102 is mounted inside second vent apparatus 20 and illustrated in FIG. 4. Tank venting control assembly 102 resides in a housing 100 adapted to be mounted in an aperture 92 formed in raised top wall 46 of vapor dome 14. Venting control assembly 102 is mounted in an upper portion of housing 100 to provide venting of fuel vapor from vapor-receiving space 28 of vapor dome 14 at relatively high vapor flow rates when fuel vapor pressure rises above the predetermined maximum pressure level and to allow air to enter the vehicle fuel tank when the fuel vapor pressure in the fuel tank drops below a predetermined "minimum pressure" level due, e.g., to sudden cooling. A rollover valve assembly 104 is mounted in a lower portion of housing 100 to provide means for blocking flow of liquid fuel and fuel vapor through tank venting control assembly 102 when fuel tank 12, 14 rolls over or experiences a change in attitude in excess of a predetermined amount. Advantageously, tank venting control assembly 102 provides a compact, integrated package capable of performing pressure relief, rollover closure, and vacuum relief functions.

Housing 100 includes a cylindrical portion 106 extending into vapor-receiving space 28 of vapor dome 14, a cover 108 which snap-fits onto an upper portion 128 of the cylindrical portion 106 at an upper end thereof, and a retainer 110 which snap-fits onto a lower portion 129 of cylindrical portion 106 at a lower end thereof. Lower portion 129 of cylindrical portion 106 is formed to include a side inlet 112 allowing fuel vapor from vapor-receiving space 28 in vapor dome 14 to pass therethrough as shown best in FIG. 4.

Housing 100 also includes a hollow interior 114 which is partitioned into a lower rollover valve chamber 116 and an upper venting control chamber 118 by partition 120. Partition 120 is appended to cylindrical portion 106 and arranged to lie in a generally horizontal orientation inside hollow chamber 114 as shown in FIG. 4. A first venting aperture 122 formed in partition 120 interconnects venting control chamber 118 and rollover valve chamber 116 in fluid communication as shown in FIG. 4.

Lower rollover valve chamber 116 is bounded by vertical lower cylindrical portion 129 of housing 100, horizontal retainer 110, and horizontal partition 120 as shown best in FIG. 4. First venting aperture 122 provides a downwardly facing conically shaped valve seat 124 facing toward the underlying rollover valve assembly 104 situated in rollover valve chamber 116. Rollover valve assembly 104 is configured to provide means for regulating or selectively blocking flow of fuel vapor from vapor-receiving space 28 of vapor dome 14 toward venting outlet 35 through first venting aperture 122.

Rollover valve assembly 104 includes a nipple 126 adapted to seat against conical valve seat 124 formed on partition 120 to prevent the flow of fuel vapor through first venting aperture 122 during tilting of vehicle fuel tank unit 12, 14 in excess of a predetermined amount. Changes in vehicle fuel tank attitude in excess of a predetermined amount cause rollover valve assembly 104 to move in rollover valve chamber 116 to place nipple 126 in engagement with conical valve seat 124, thereby closing first venting aperture 122. Fuel vapor and liquid fuel which enters rollover valve chamber 116 from fuel tank unit 12, 14 through, e.g., side inlet 112, is thereby prevented from leaking out of fuel tank unit 12, 14 through first venting aperture 122. Thus, rollover valve assembly 104 can provide upstream means for regulating flow of fuel vapor to venting control chamber 118.

The particular rollover valve assembly 104 illustrated in FIG. 4 is described in more detail in U.S. Pat. No. 5,028,244 to Szlaga, which description is incorporated by referenced herein. Of course, it will be understood that other types of rollover valves, including float valves, inertial ball-and-ramp valves, and others, may be used in accordance with the invention to provide suitable rollover closure.

Venting control chamber 118 is bounded by an upper portion 128 of cylindrical portion 106, cover 108, and partition 120 located inside cylindrical portion 106. Upper portion 128 is formed to include an outlet passage 130 passing through venting outlet 35 and discharging pressurized fuel vapor from fuel tank unit 12, 14 or admitting outside air into fuel tank unit 12, 14. Venting control assembly 102 is positioned to lie in venting control chamber 118 for movement therein to provide means for regulating or selectively blocking the flow of fuel vapor through venting control chamber 118, and thus through outlet passage 130 in venting outlet 35.

An annular upwardly facing ledge 132 is formed by an inside wall of housing 100. Ledge 132 is formed to include an upwardly facing, annular pressure-relief valve seat 134. A resilient pressure-relief valve 135 includes a support plate 136 and a sealing member 138 as shown in FIG. 4. Pressure-relief valve 135 is normally urged against annular seat 134 as shown in FIG. 4 by a pressure-relief control spring 140 to provide a seal preventing the flow of fuel vapor out of fuel tank unit 12, 14 through venting outlet 35. Spring 140 is positioned inside venting control chamber 118 to engage a downwardly facing surface 141 inside an annular side wall 142 formed in cover 108. Spring 140 also engages an upwardly facing surface 143 located inside annular side wall 144 formed on pressure-relief valve 135. Compression spring 140 has a spring constant designed to yieldably urge pressure-relief valve 135 downwardly against annular valve seat 134 provided on ledge 132 in housing 100.

In its closed position, pressure-relief valve 135 is biased by spring 140 to provide a seal between annular sealing member 138 and annular valve seat 134. In response to fuel vapor pressure against the sealing member 138 of pressure-relief valve 135 in excess of a predetermined superatmospheric pressure, pressure-relief valve 135 is urged upwardly away from annular valve seat 134 on ledge 132 to open the venting aperture defined by annular valve seat 134 allowing for the discharge of pressurized fuel vapor from fuel tank unit 12, 14 and out of venting outlet 35 through venting passage 130. Once sufficient pressurized fuel vapor has been discharged to reduce the pressure of the fuel vapor in fuel tank unit 12, 14 below the predetermined maximum tank pressure, spring 140 once again yieldably urges pressure-relief valve 135 downwardly against the annular valve seat 134 to a position closing the venting aperture defined by annular valve seat 134.

A vacuum-relief valve 146 is positioned to lie beneath pressure-relief valve 135 as shown best in FIG. 4. Vacuum-relief valve 136 includes a radially outwardly extending annular ledge 148 and an upstanding annular sealing rim 150 appended to the ledge 148. A vacuum-relief control spring 152 normally urges overlying sealing surface 138 of pressure-relief valve member 136 to provide an annular seal preventing the flow of fuel vapor or air into fuel tank unit 12, 14 through a central aperture 153 formed in pressure-relief valve 135. Vacuum-relief control spring 152 lies in a lower portion of venting control chamber 118 and has a lower end positioned in annular groove 154 formed in the partition 120 and an upper end positioned in annular groove 156 formed in vacuum valve ledge 148. Spring 152 has a spring constant designed to yieldably urge vacuum-relief valve 146 upwardly against the annular sealing member 138 of pressure-relief valve 135 normally to close central aperture 153 formed in pressure-relief valve 135.

In its closed position, vacuum-relief valve 146 provides a seal between sealing member 138 of pressure-relief valve 135 and sealing rim 150. Once the pressure in fuel tank unit 12, 14 falls to reach a predetermined subatmospheric pressure, vacuum-relief valve 146 is drawn downwardly away from pressure-relief valve 135 to open central aperture 153, thereby allowing the flow of fuel vapor or air into fuel tank unit 12, 14 through venting outlet 35 and venting control chamber 118. Once sufficient fuel vapor or air has entered fuel tank unit 12, 14 through fuel vapor control valve 10 to raise the pressure in fuel tank unit 12, 14 above the predetermined minimum tank pressure, vacuum-relief control spring 152 yieldably urges vacuum valve member 146 in an upward direction against sealing member 138 to close central aperture 153 formed in pressure-relief valve 135.

Vacuum-relief valve 146 includes an annular lower wall 158 appended to the underside of ledge 148. Annular lower wall 158 slidably engages an upstanding annular guide wall 160 appended to the top side of partition 120 as shown in FIG. 4. Annular guide wall 160 fits inside a cylindrical cavity 162 formed inside annular lower wall 158. Guide wall 160 is sized to guide upward and downward movement of vacuum-relief valve 146 during opening and closing of vacuum-relief valve 146.

Vacuum-relief valve 146 further includes a conical base 164 appended to ledge 148 as shown in FIG. 4. Conical base 164 is formed to define an upwardly facing, generally conical ramp portion 166 centered around a central venting aperture 168. An annular upper wall 170 is appended to conical base 164 and arranged to surround conical ramp portion 166 and central venting aperture 168. A ball-type head valve 172 is positioned for lateral movement within a ball-receiving space 174 defined by conical base 164, surrounding annular upper wall 170, and overlying housing cover 108. Sealing ball 172 functions to provide a pressure-relief head valve that moves to open venting aperture 168 in response to vehicle motion.

Sealing ball 172 is sized to rest on conical ramp portion 166 and to seat in and close venting aperture 168 when second vent apparatus 20 is in a stationary condition as shown in FIG. 4. Conical ramp portion 166, sealing ball 172, and venting conical aperture 168 are sized and shaped to permit sealing ball 172 to be displaced relatively easily from its normal position closing venting aperture 168 when the vehicle (not shown) carrying fuel tank unit 12, 14 and second vent apparatus 20 are disturbed, such as when the vehicle is in motion.

Annular upper wall 170 provides a head valve cage to retain sealing ball 172 generally in a position above venting aperture 168 formed in conical base 166. As illustrated in FIGS. 4-8, annular upper wall 170 has an inner diameter somewhat greater than the outer diameter of sealing ball 172. The greater inner diameter of annular wall 170 is provided to permit sealing ball 172 to move laterally upon conical ramp portion 166 whenever the vehicle is in motion. It will be understood that permitting sealing ball 172 to move laterally upon conical ramp portion 166 permits sealing ball 172 to move away from and open the venting aperture 168, thereby allowing open flow into and out of fuel tank unit 12, 14 through venting aperture 168. Thus, this lateral movement, or "rattle" of sealing ball 172 permits generally unrestricted venting of fuel tank unit 12, 14 when the vehicle is in motion.

However, when the vehicle is not in motion, the weight of sealing ball 172 generates a preselected, yieldable sealing force acting on sealing ball 172 to cause sealing ball 172 to seal and close venting aperture 168. Sealing ball 172 functions to determine the head pressure that develops within fuel tank 24 unit 12, 14 during refueling operations. This preselected head pressure within fuel tank unit 12, 14 is advantageous during the tank-filling operation of fuel tank unit 12, 14 and will be discussed in greater detail below.

A sequence of operation of tank venting control assembly 102 is illustrated in FIGS. 4-8. Referring to FIG. 4, upper spring 140 normally acts to urge sealing member 138 of pressure-relief valve 135 downwardly to its flow-blocking position against underlying annular valve seat 134. Lower spring 152 normally acts to urge annular rim 150 on vacuum-relief valve 146 upwardly to its flow-blocking position against sealing member 138 and closing central aperture 153 formed in pressure-relief valve 135. At the same time, sealing ball 172 closes venting aperture 168 formed in vacuum-relief valve 146. Thus, no fuel vapor is conducted from vapor-receiving space 28 in the vapor dome 14 to venting outlet 35 through venting control assembly 102, and no fuel vapor from fuel vapor-recovery canister 24 or air from the atmosphere is conducted through venting outlet 35 and tank venting control assembly 102 into vapor-recovery space 28 in vapor dome 14.

Figures 10, 10A, 10B:
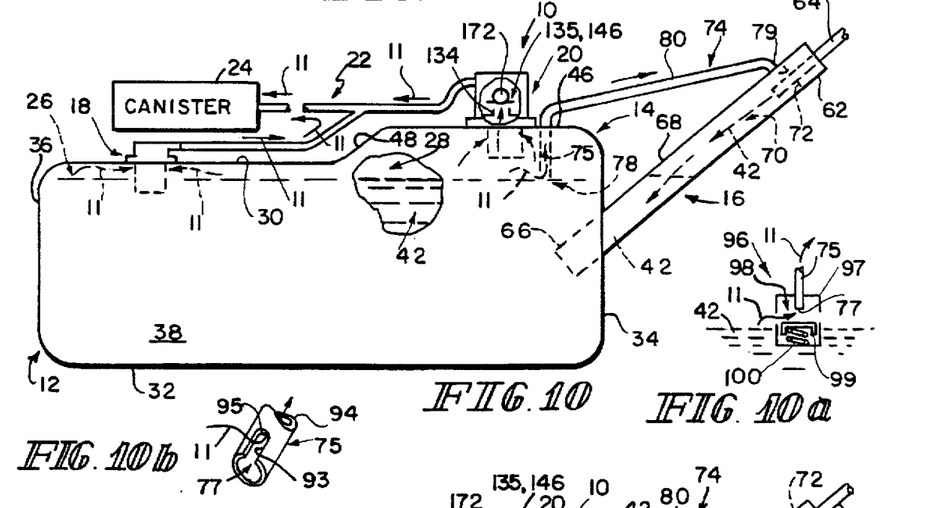
FIG. 10 is a view similar to FIG. 9 at a point in time after the liquid fuel level inside the tank has risen to its 85% full level.
FIG. 10a is a view similar to FIG. 9a showing a rising liquid fuel level adjacent but below the closure valve.

Because liquid fuel 42 (shown in FIG. 1) is capable of expanding within fuel tank unit 12, 14 under certain temperature conditions, and because liquid fuel 42 is capable of producing fuel vapor, it is desirable to limit the level of liquid fuel 42 in fuel tank unit 12, 14 to a level somewhat below the raised top wall 46 of vapor dome 14 in the tank-filling operation to accommodate this expansion of fuel or creation of fuel vapor. This space is illustrated in FIG. 10 as an "expansion volume" defined, in the illustrated embodiment, by vapor-receiving space 28. The amount of the expansion volume is generally dictated by the position of a top edge of open mouth 77 of inner end 75 of nozzle shut-off tube 74 below raised top wall 46 of vapor dome 14.

When filler neck 16 is full of liquid fuel 42, the level of liquid fuel 42 within filler neck 16 will be normally higher than the level of liquid fuel 42 within fuel tank unit 12, 14 as shown in FIG. 10. It will be understood that this higher level of liquid fuel 42 in filler neck 16 creates a pressure, or "pressure head" that is exerted into fuel tank unit 12, 14. This pressure head will vary depending upon the distance that the level of liquid fuel 42 in filler neck 16 exceeds the level of liquid fuel 42 in fuel tank unit 12, 14.

If tank venting control assembly 102 permitted generally unrestricted vapor release during this tank-filling operation, it will be understood that the pressure head created by liquid fuel 42 in filler neck 16 could cause the expansion volume in fuel tank unit 12, 14 to decrease. This could occur because the pressure within the expansion volume would be permitted to vent through tank venting control assembly 102, which venting which would allow liquid fuel 42 in filler neck 16 to flow into fuel unit 12, 14 to cause the level of liquid fuel 42 to rise in fuel tank unit 12, 14. As previously discussed, it is desirable to maintain a preselected amount of expansion volume in fuel tank 12, 14. To prevent the level of liquid fuel 42 from rising in fuel tank unit 12, 14 due to the pressure head created by liquid fuel 42 in filler neck 16, it is necessary to maintain a pressure head in fuel tank unit 12, 14 to overcome the pressure head created in filler neck 16.

To provide the pressure head in fuel tank unit 12, 14 necessary to maintain the desired amount of expansion volume, it is necessary to disable the venting capability of tank venting control assembly 102 during the tank-filling operation. To disable second vent apparatus 20, sealing ball 172 is configured to seat in and close venting aperture 168 formed in vacuum-relief valve 146 when the vehicle is stationary. This permits sealing ball 172 to close venting aperture 168 so as to close off the venting capability of tank venting control assembly 102 in second vent apparatus 20. The weight of sealing ball 172 is selected to maintain the proper pressure head within fuel tank unit 12, 14 to maintain the desired amount of expansion volume during refueling. Illustratively, if filler neck 16 extends 10 inches (25.4 cm) above raised top wall 46 of the vapor dome 14, then sealing ball 172 can be selected to maintain a pressure head of 12 inches (30.5 cm) in fuel tank unit 12, 14. This will prevent the pressure head created in filler neck 16 from reducing the desired amount of expansion volume in fuel tank unit 12, 14 during refueling.

Figures 5, 6, 7, 8:
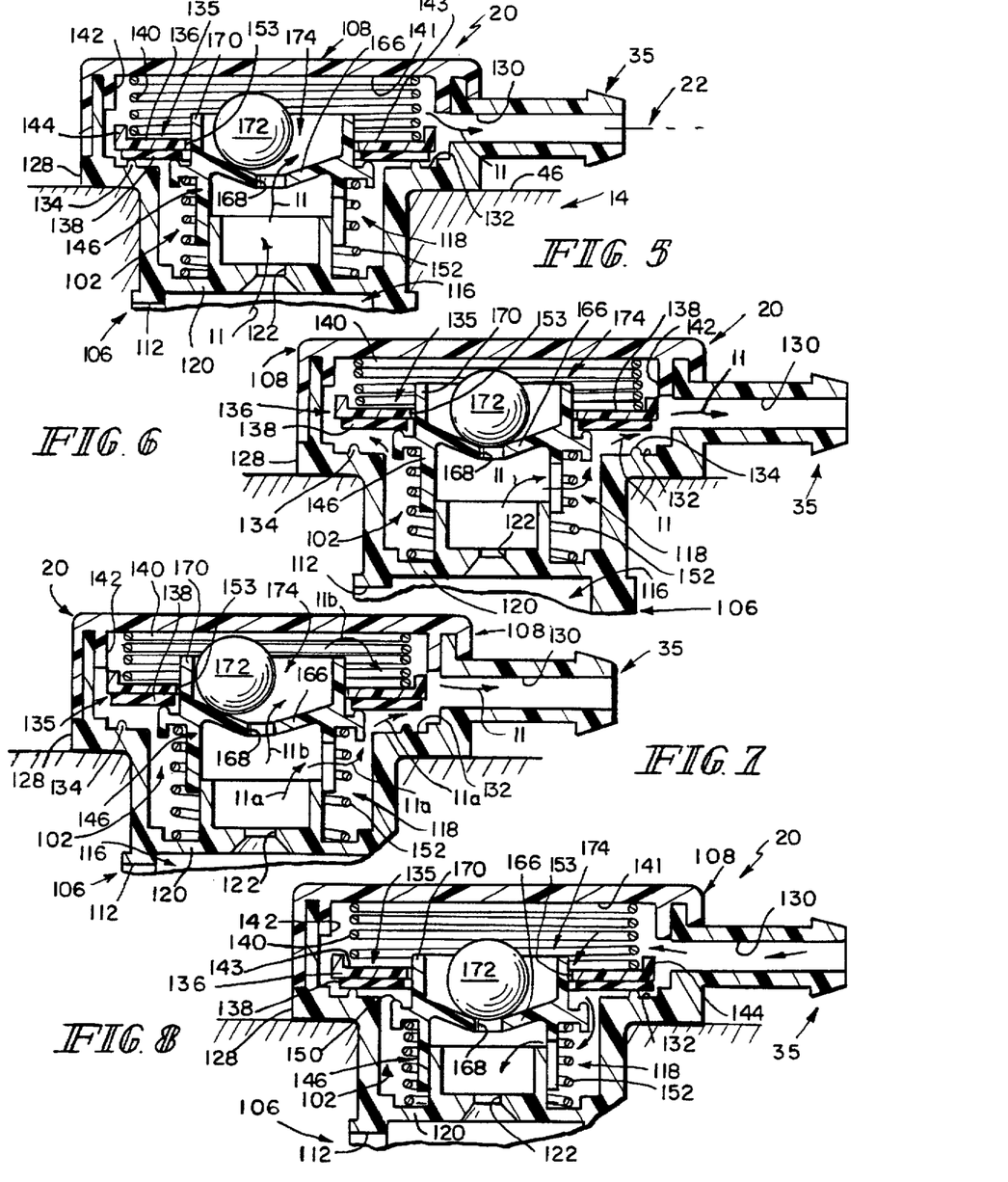
FIG. 5 is a view of a top portion of the second vent apparatus illustrated in FIG. 4 showing lateral displacement of the ball-type head valve during vehicle motion resulting in the flow of pressurized fuel vapor from the vehicle fuel tank to the venting outlet through a venting aperture formed in the vacuum-relief valve and uncovered by lateral displacement of the ball-type head valve.
FIG. 6 is a view similar to FIG. 5 showing the second vent apparatus in a pressure-release position with the annular pressure-relief valve raised against its biasing spring and away from its underlying seat to permit pressurized fuel vapor in the fuel tank to flow past the pressure-relief valve to the venting outlet.
FIG. 7 is a view similar to FIG. 6 showing the second vent apparatus in another pressure-release position with the annular pressure-relief valve raised away from its underlying seat while the vehicle is in motion, which motion causes the ball-type head valve to move laterally and uncover the underlying venting aperture, thereby providing an additional path for the escape of pressurized fuel vapor from the vehicle fuel tank to the venting outlet.
FIG. 8 is a view similar to FIG. 7 showing the second vent apparatus in a vacuum-relief position with the vacuum-relief valve pulled against its biasing spring and away from sealing engagement with the underside of the annular pressure-relief valve due to subatmospheric tank pressure, thereby permitting the flow of air from the atmosphere through the venting outlet and the upper chamber into the fuel tank.

After the tank-filling operation is complete, and the proper expansion volume in fuel tank unit 12, 14 has been created, it is desirable to permit generally unrestricted venting from vapor-receiving space 28 of vapor dome 14 through tank venting control assembly 102 in second vent apparatus 20. To permit this generally unrestricted venting, sealing ball 172, annular upper wall 170, and conical ramp portion 166 cooperate to permit sealing ball 172 to rattle and move laterally within ball-receiving space 174 to open venting aperture 168 as shown in FIG. 5. By permitting sealing ball 172 to move away from venting aperture 168, tank venting control assembly 102 then permits fuel vapor 11 to vent from fuel tank unit 12, 14 in a generally unrestricted manner. Thus, as long as the vehicle (not shown) is in motion, sealing ball 172 is generally located on conical ramp portion 166 in a position opening venting aperture 168. Thus, upon lateral acceleration of tank venting control assembly 102 (caused by vehicle motion), ball-type head valve 172 will be moved away from venting aperture 168, thereby allowing open flow of fuel vapor 11 through venting aperture 168 and diminishing tank pressure below the predetermined maximum pressure established by pressure-relief valve 135. This venting helps to eliminate any unwanted residual tank pressure extant in fuel tank unit 12, 14 during vehicle motion.

It will be understood that should the vehicle (not shown) remain stationary for a lengthy period of time after filling, the pressure in fuel tank unit 12, 14 could increase due to changes in fuel temperature. If the pressure in fuel tank unit 12, 14 exceeds the predetermined maximum pressure, pressure-relief valve 135 will be forced upward, compressing spring 140 and disengaging sealing member 138 from annular valve seat 134 to permit the flow of fuel vapor 11 from fuel tank unit 12, 14 to venting outlet 35 in second vent apparatus 20, as shown in FIG. 6. It will be apparent to those skilled in the art that by varying the material of spring 140, the physical dimensions of spring 140, or in some other way altering the spring constant of spring 140, one may vary the predetermined maximum pressure allowed in fuel tank unit 12, 14.

It will also be understood that a vehicle (not shown) in motion could experience high-pressure levels of the fuel vapor in fuel tank unit 12, 14. If the pressure in fuel tank unit 12, 14 exceeds the predetermined maximum pressure while the vehicle is in motion, pressure-relief valve 135 will be forced upward, compressing upper spring 140 and disengaging sealing member 138 from annular valve seat 134 to open a first path for the flow of fuel vapor 11a from fuel tank unit 12, 14 to venting outlet 35 of second vent apparatus 20 as shown in FIG. 7. In addition, rattle of sealing ball 172 caused by lateral forces present during vehicle transit will result in generally unrestricted venting through venting aperture 168, opening a second path for the flow of fuel vapor 11b from fuel tank unit 12, 14 to venting outlet 35 of second vent apparatus 20, as also shown in FIG. 7. It is expected that development of conditions which would cause venting past both pressure-relief valve 135 and sealing ball 172 will not occur frequently.

Finally, it will be understood that should the vehicle (not shown) remain stationary for a lengthy period of time, the pressure in fuel tank unit 12, 14 could decrease due to changes in fuel temperature. If the pressure in fuel tank 12, 14 is less than the predetermined minimum pressure, vacuum-relief valve 146 will be pulled downward by suction forces caused by subatmospheric pressure in fuel tank unit 12, 14, compressing lower spring 152, and disengaging the rim 150 from sealing member 138 to permit the flow of air and/or fuel vapor from venting outlet 35 of second vent apparatus to fuel tank unit 12, 14, as shown in FIG. 8. It will be apparent to those skilled in the art that by varying the material of spring 152, the physical dimensions of spring 152, or in some other way altering the spring constant of spring 152, one may vary the predetermined minimum pressure allowed in fuel tank unit 12, 14.

Figure 11:
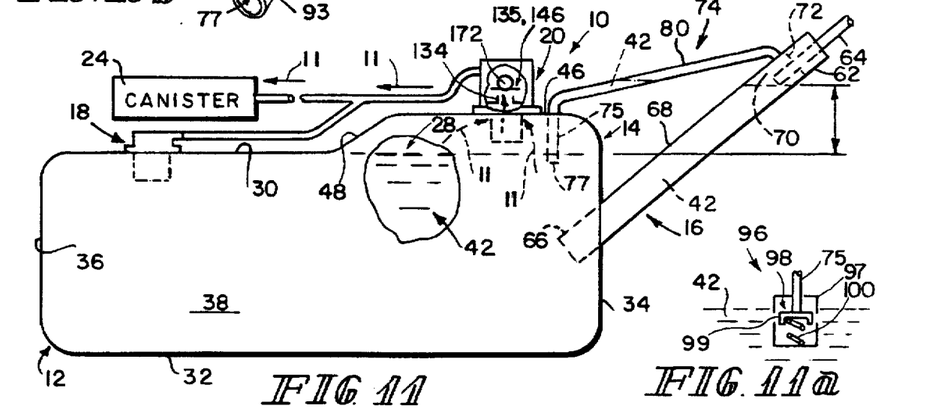
FIG. 11 is a view similar to FIG. 10 at a point in time after the liquid fuel level inside the tank has risen to its 90% full level and moved the float-type rollover valve to its closed position so that fuel vapor no longer vents through the first vent apparatus and the "closed" inlet end of the nozzle shut-off tube so as to minimize tank overfill problems caused by a pump operator introducing liquid fuel into the fuel tank using the trickle-fill method.

The operation of a presently preferred embodiment of tank venting system 10 during refueling is shown in FIGS. 9–11. The level of liquid fuel 42 in tank unit 12, 14 is shown at a very low level in FIG. 9. Fuel vapor 11 is venting to vapor-recovery canister 24 through first and second vent apparatus 18, 20 and fuel vapor conduit 22 as liquid fuel 42 is passing into tank 12 through filler neck 16. At the same time, fuel vapor 11 is passing from tank unit 12, 14 to fuel nozzle chamber 70 in filler neck 16 through nozzle shut-off tube 74. Illustratively, fuel vapor pressure in vapor-receiving space 28 of vapor dome 14 is high enough to raise pressure-relief valve 135 in second vent apparatus 20 to its venting position (shown diagrammatically in FIG. 9 and illustratively in FIG. 6). Because the vehicle (not shown) carrying tank unit 12, 14 is stationary during refueling, sealing ball 172 remains in its closed position as shown in FIG. 6.

The level of liquid fuel 42 inside tank unit 12, 14 has risen to its 85% full level during refueling as shown in FIG. 10. At this stage, pressurized fuel vapor 11 in tank unit 12, 14 is still venting to vapor-recovery canister 24 through first and second vent apparatus 18, 20 and fuel vapor conduit 22. Illustratively, the fuel vapor pressure in vapor-receiving space 28 of vapor dome 14 is still high enough to raise pressure-relief valve 135 in second vent apparatus 20 to its venting position (shown diagrammatically in FIG. 10 and illustratively in FIG. 6).

At this 85% full level, the crest of liquid fuel 42 inside tank unit 12, 14 has risen to intercept the lowermost end of fuel shut-off nozzle tube 74 as shown in FIG. 10. Some pressurized fuel vapor 11 from vapor-receiving space 28 of vapor dome 14 is venting through fuel shut-off tube 74 to fuel nozzle chamber 70 in filler neck 16 because of a vertical "trickle-fill" slot 93 formed in a side wall 94 of inlet end 75 of fuel shut-off tube 74 as shown, for example, diagrammatically in FIG. 10 and illustratively in FIG. 10b. Such venting of fuel vapor 11 will cease once the level of liquid fuel 42 in tank unit 12, 14 rises to cover a topmost edge 95 of slot 93 as shown diagrammatically in FIG. 11. Reference is hereby made to Robert S. Harris U.S. application Ser. No. 08/241,186 entitled "Fill Limit Valve Assembly," which is incorporated by reference herein, for its disclosure relating to functions and configurations of various trickle-fill slots and apertures.

The level of liquid fuel 42 in fuel tank unit 12, 14 is shown at the 90% full level in FIG. 11. At this stage, fuel vapor 11 is only venting to vapor-recovery canister 24 through second vent apparatus 20 and is no longer venting through first vent apparatus 18 because the level of liquid fuel 42 inside tank 12 has risen to a level sufficient to raise flow control valve 83 enough to cause nipple 87 to engage conical valve seat 88 and close the venting aperture formed therein. Also, no venting of fuel vapor through nozzle shut-off tube 74 is taking place since inlet end 75 of nozzle shut-off tube 74 is immersed in liquid fuel 42. Illustratively, the fuel vapor pressure in vapor-receiving space 28 of vapor dome 14 is still high enough to raise pressure-relief valve 135 in second vent apparatus 20 to its venting position (shown diagrammatically in FIG. 11 and illustratively in FIG. 6).

Operation of nozzle shut-off tube 74 is illustrated, for example, in FIGS. 10 and 11. When fuel-dispensing pump nozzle 64 is activated to begin pumping of liquid fuel as indicated by the arrows 42, an effective seal is created at an axially lower end of fuel nozzle chamber 70 by the fuel flowing into fill tube 68. This seal is established because of the close matching of the diameter of the discharge end of nozzle 64 and the diameter of fill tube 68. Thus, a substantially sealed fuel nozzle chamber 70 is established under these fuel pumping conditions. Because fuel nozzle chamber 70 is substantially sealed, a vacuum is created within this chamber 70 due to the pumping of the fuel. To prevent the vacuum within chamber 70 from rising above a preset level which would otherwise activate the conventional automatic shut-off features of nozzle 64, "make-up" air is provided to chamber 70 through nozzle shut-off tube 74 which extends into the fuel tank unit 12, 14. By providing this "make-up" air, the vacuum within fuel nozzle chamber 70 is controlled, and is maintained below the preset level necessary to shut off the nozzle 64. It will be understood that the size of the passage in nozzle shut-off tube 74 is selected to permit the correct amount of "make-up" air or vapor to flow constantly into the fuel nozzle chamber 70.

When the lower end 75 of nozzle shut-off tube 74 becomes immersed in or covered with liquid fuel, the supply of "make-up" air to the fuel nozzle chamber 70 will immediately cease. When this "make-up" air is eliminated from the fuel nozzle chamber 70, the vacuum within the fuel nozzle chamber 70 quickly rises above the preset level necessary to disable the nozzle 64. Thus, the inflow of liquid fuel 42 from the nozzle 64 is immediately shut off. Because the flow of "make-up" air is shut off immediately in nozzle shut-off tube 74 which immediately results in automatic shut-off of the nozzle 64, the filling level within the tank unit 12, 14 is accurately controlled by proper placement of the lowermost end of the nozzle shut-off tube 74 inside tank unit 12, 14.

A liquid fuel-actuated closure mechanism 96 is mounted on inlet end 75 of nozzle shut-off tube 74 in the alternative embodiment shown in FIGS. 9a, 10a, and 11a. Closure mechanism 96 includes a float housing 97 formed to include a chamber 98 having a fuel-vapor-receiving inlet and containing open mouth 77 of inlet end 75 of nozzle shut-off tube 74. Closure mechanism 96 also includes a float valve 99 positioned in chamber 98 for movement between an inlet end-opening position shown in FIGS. 9a and 10a and an inlet end-closing position shown in FIG. 11a. A spring 100 is positioned in chamber 98 to bias float valve 99 normally toward its inlet end-closing position as shown in FIGS. 9a and 10a.

Figure 12:
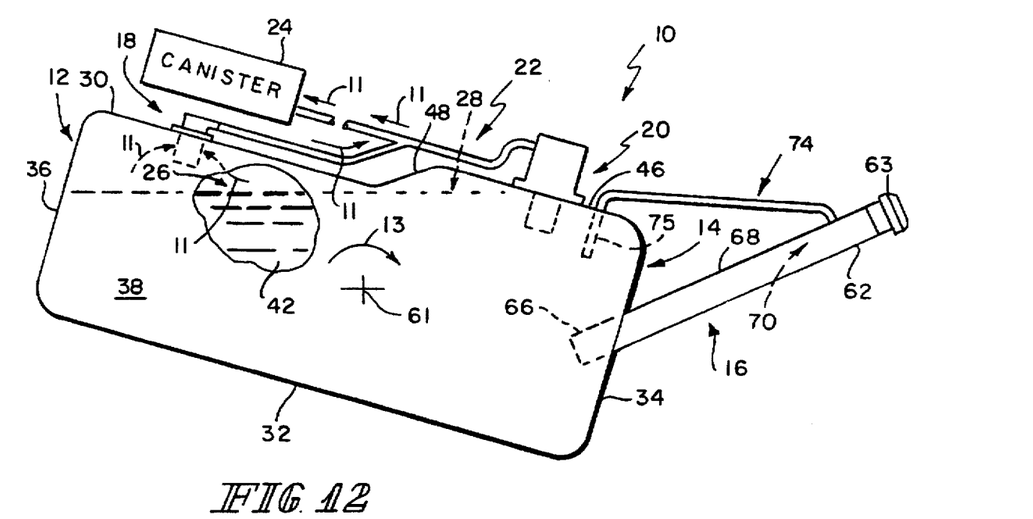
FIG. 12 is a diagrammatic view similar to FIG. 1 showing fuel vapor venting through the first vent apparatus and closure of the second vent apparatus when the tank is tilted in one direction to a first inclined position.
Figure 13:
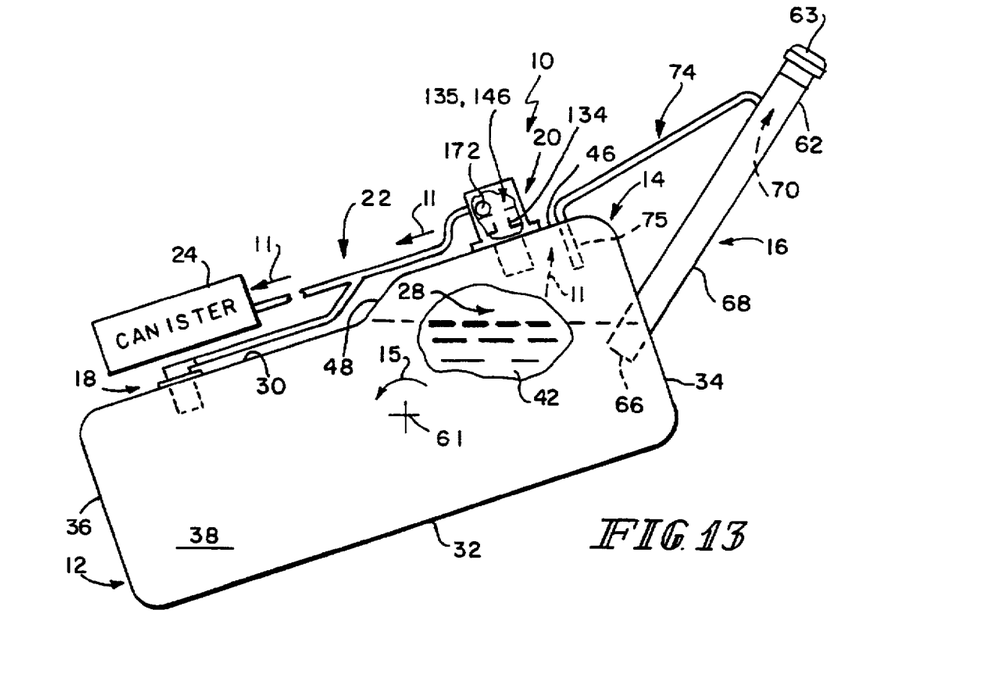
FIG. 13 is a diagrammatic view similar to FIG. 12 showing fuel vapor venting through the second vent apparatus and closure of the first vent apparatus when the tank is tilted in another direction to a second inclined position.

Venting of fuel vapor 11 from tank unit 12, 14 during various inclined positions of tank unit 12, 14 is shown in FIGS. 12 and 13. These and other similar inclined positions can be established whenever a vehicle carrying tank unit 12, 14 is driven over a banked road or parked in a side-hill-lie position and the tank unit 12, 14 is mounted so that filler neck 16 opens on a side of the vehicle. Fuel vapor 11 is venting from interior region 26 of tank 12 and vapor-receiving space 28 of vapor dome 14 through first vent apparatus 18 when tank unit 12, 14 is rotated in clockwise direction 13 about transverse axis 61 as shown in FIG. 12, even though second vent apparatus 20 is closed (e.g., pressure-relief valve 135 and sealing ball 172 occupy vent-closing positions shown in FIG. 4).

As shown in FIG. 13, fuel vapor 11 is venting from vapor-receiving space 28 of vapor dome 14 and interior region 26 of tank 12 through second vent apparatus 20 when tank unit 12, 14 is rotated in counterclockwise direction 15 about transverse axis 61 even though first vent apparatus 18 is closed (e.g., flow control valve 83 is moved by liquid fuel 42 to cause nipple 87 to engage conical valve seat 88 and close the vent aperture formed therein). Advantageously, first and second vent apparatus 18, 20 are thus arranged to continue to vent tank unit 12, 14 even though tank unit 12, 14 is inclined in a variety of positions.

Figure 14:
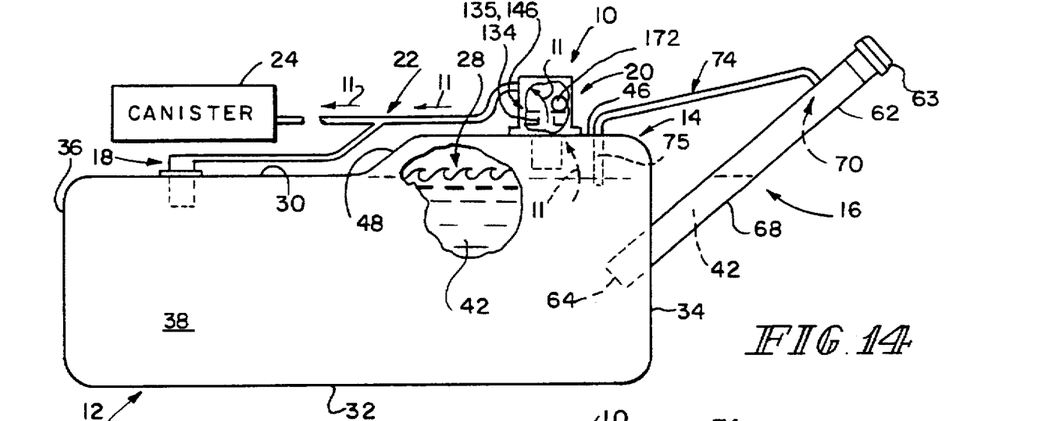
FIG. 14 is a diagrammatic view similar to FIG. 1 of a tank filled with liquid fuel to its 90% full level while a vehicle carrying the tank is in motion showing only fuel vapor venting to the vapor-recovery canister through the second vent apparatus due to displacement of the motion-actuated, ball-type head valve to a fuel vapor venting position.
Figure 15:
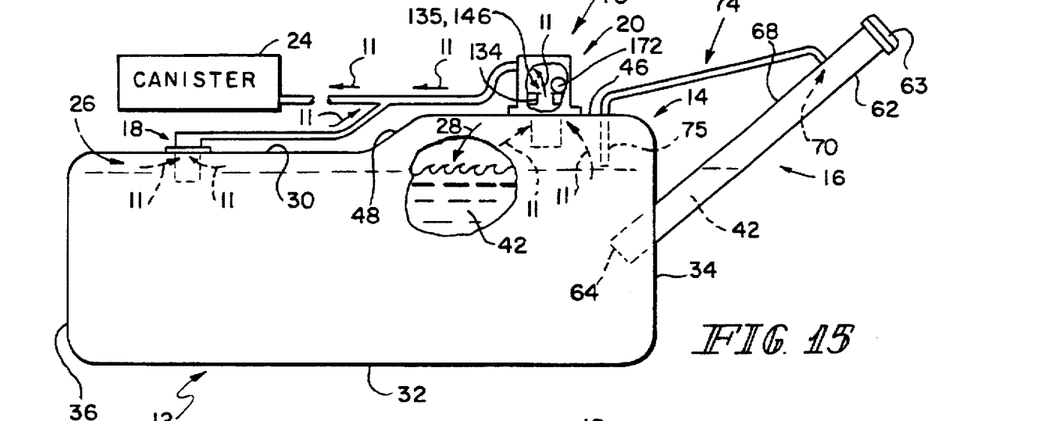
FIG. 15 is a diagrammatic view similar to FIG. 14 of a tank filled with liquid fuel to its 85% full level while a vehicle carrying the tank is in motion showing normal fuel vapor venting to the vapor-recovery canister through the first vent apparatus and showing fuel vapor venting to the vapor recovery canister through the second vent apparatus due only to displacement of the motion-actuated, ball-type head valve to its fuel vapor venting position.

Operation of tank venting system 10 while the vehicle carrying tank unit 12, 14 is in motion, which accounts for the diagrammatic "waves" at the top of liquid fuel 42 inside tank unit 12, 14, is shown in FIGS. 14 and 15. In FIG. 13, the level of liquid fuel 42 inside tank unit 12, 14 is at the 100% full level so that only fuel vapor venting through second vent apparatus 20 is permitted. Illustratively, fuel vapor pressure in vapor-receiving space 28 of vapor dome 14 is vented through venting aperture 168 formed in vacuum-relief valve 146 due to unseating of sealing ball 172 to its venting position (shown diagrammatically in FIGS. 14 and 15 and illustratively in FIG. 5). The level of liquid fuel 42 in tank unit 12, 14 has lowered to the 85% full level in FIG. 15 so that venting can occur through first and second vent apparatus 18, 20.

Figure 16:
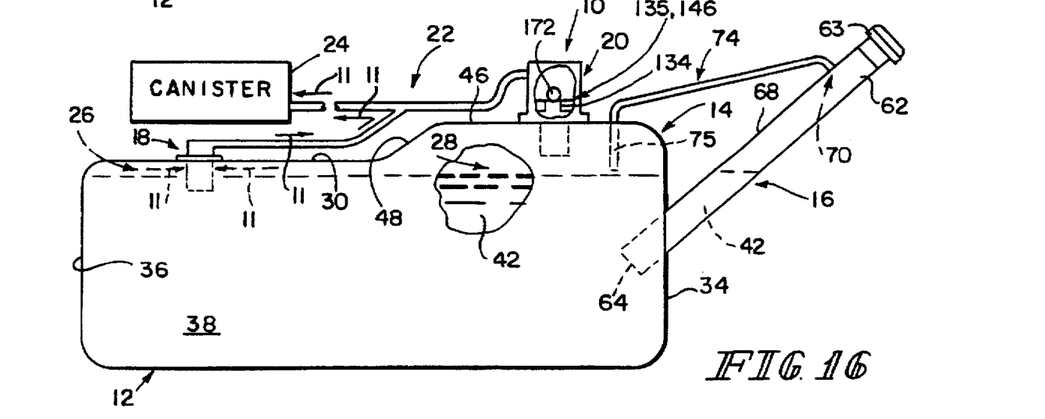
FIG. 16 is a diagrammatic view similar to FIG. 15 of a stationary tank (or a tank in a vehicle traveling at constant velocity) filled with liquid fuel to about its 85% full level showing normal fuel vapor venting to the vapor-recovery canister and no fuel vapor venting through the second vent apparatus (until a predetermined head pressure is reached in the vapor-receiving space of the, vapor dome).

Finally, tank venting system 10 is shown in a tank unit 12, 14 that is stationary (or moving at constant velocity) in FIG.

16. In this condition, venting of pressurized fuel vapor 11 through first vent apparatus 18 is taking place. However, there is no pressurized fuel vapor 11 venting through second vent apparatus 20 because the pressure of fuel vapor 11 in tank unit 12, 14 is not high enough to lift pressure-relief valve 135 in second vent apparatus 20 to its venting position shown in FIGS. 6 and 7 and there is no vehicle acceleration taking place which could move sealing ball 172 laterally to its vent-opening position shown in FIGS. 5 and 7. Instead, second vent apparatus 20 is arranged in the closed position shown in FIG. 4.

During filling of fuel tank unit 12, 14, the majority of displaced and newly created fuel vapor from the filling process exits tank unit 12, 14 through nozzle shut-off tube 74 to fuel nozzle chamber 70 in filler neck 16. Some fuel vapor exits tank unit 12, 14 through the "low-mounted" first vent apparatus 18 and a similar amount may exit tank unit 12, 14 through the "high-mounted" second vent apparatus 20 (unless second vent apparatus 20 includes a head valve to block fuel vapor discharge therethrough at tank pressure levels of the magnitude typically generated during refueling).

When a full tank is signalled by liquid fuel covering open mouth 77 in inlet end 75 of nozzle shut-off tube 74 causing automatic shut-off of nozzle 64, the pump operator may choose (wittingly or unwittingly) to try to overfill the tank unit 12, 14 by the process called trickle-filling. As noted previously, trickle-fill is the process of adding liquid fuel very slowly to the fuel tank to increase total fill by allowing fuel vapor otherwise trapped in a vapor dome to escape through a vent opening of the type provided by a rollover valve.

The use of two or more vent valves (such as vent apparatus 18, 20) in accordance with the present invention could increase the potential for trickle-fill by increasing tank venting capacity, thereby allowing relatively fast trickle-filling. As shown, for example, in FIG. 11, first vent apparatus 18 is mounted to lie "below" second vent apparatus 20 so that float valve 86 in first vent apparatus 18 will be floated on rising liquid fuel in tank unit 12, 14 to its closed position when the level of liquid fuel in tank unit 12, 14 reaches its 90% full level and just before the first "automatic" shut-off of nozzle 64 caused by operation of nozzle shut-off tube 74. Thus, when trickle-filling is attempted, only the second vent apparatus 20 is venting. If absolute control over trickle-fill is desired, the higher second vent apparatus 20 can be equipped with a head valve to prevent venting in the static position at refueling pressures as described above.

Although the invention has been described in detail with reference to preferred embodiments, additional variations and modifications exist within the scope and spirit of the invention as described and defined in the following claims.

I claim:

1. A tank venting system comprising
 a tank formed to include an interior region, the tank including a top wall overlying a first portion of the interior region and a bottom wall underlying the top wall and defining a floor of the interior region,
 a vapor dome positioned to rise vertically above the top wall of the tank, the vapor dome being formed to include a vapor-receiving space overlying a second portion of the interior region of the tank adjacent to the first portion and communicating with the interior region of the tank to receive fuel vapor generated by liquid fuel contained in the interior region of the tank, the vapor dome including a raised top wall defining a ceiling of the vapor-receiving space and lying at a first elevation vertically above the top wall of the tank so that the top wall of the tank lies at a second elevation vertically above the bottom wall of the tank and vertically below the elevation of the raised top wall of the vapor dome,
 a first vent apparatus mounted on the top wall of the tank to vent the interior region of the tank, and
 a second vent apparatus mounted on the raised top wall of the vapor dome to vent the vapor-receiving space of the vapor dome and wherein the tank further includes a first end, a filler neck coupled to the first end, an opposite second end lying in spaced-apart relation to the first end, a first side wall extending longitudinally between the first and second ends, and a second side wall extending longitudinally between the first and second ends and lying in spaced-apart relation to the first side wall, the top wall of the tank is bisected longitudinally to define a first half section adjacent to the first side wall and a second half section adjacent to the second side wall, the raised top wall of the vapor dome is bisected longitudinally to define a first half portion in close proximity to the first side wall and a second half portion in close proximity to the second side wall, the first vent apparatus is mounted in an aperture formed in the first half portion of the top wall of the tank, and the second vent apparatus is mounted in an aperture formed in the second half portion of the raised top wall of the vapor dome so that the first and second vent apparatus lie in diagonally spaced-apart relation on opposite sides of a reference line longitudinally bisecting the top wall of the tank and longitudinally bisecting the raised top wall of the vapor dome.

2. The system of claim 1, wherein the first vent apparatus includes a first housing formed to include a fuel vapor inlet located in the interior region of the tank and a fuel vapor outlet located outside the interior region of the tank and a movable flow control valve positioned inside the first housing and arranged to regulate discharge of liquid fuel and fuel vapor from the interior region of the tank through the fuel vapor outlet.

3. The system of claim 2, wherein the second vent apparatus includes a second housing formed to include a fuel vapor inlet located in the vapor-receiving space of the vapor dome and a fuel vapor outlet located outside the vapor-receiving space of the vapor dome and a flow control assembly positioned inside the second housing and arranged to regulate discharge of liquid fuel and fuel vapor from the vapor-receiving space of the vapor dome through the fuel vapor outlet of the second housing.

4. The system of claim 3, wherein the flow control assembly includes a tank pressure-relief valve.

5. The system of claim 3, wherein the flow control assembly includes a tank vacuum-relief valve.

6. The system of claim 3, wherein the flow control assembly includes a ball movably positioned inside the second housing to selectively interrupt flow of fuel vapor from the vapor-receiving space of the vapor dome through the fuel vapor outlet of the second housing.

7. The system of claim 1, wherein the first vent apparatus includes a fuel vapor inlet in the interior region of the tank and a fuel vapor outlet and the second vent apparatus includes a fuel vapor inlet in the vapor-receiving space of the vapor dome and a fuel vapor outlet, and further comprising a fuel vapor conduit interconnecting the fuel vapor outlets of the first and second vent apparatus in fluid communication and conducting fuel vapor discharged from the first and second vent apparatus toward a vapor-recovery canister.

8. The system of claim 7, wherein the first vent apparatus includes a first rollover valve assembly interconnecting the fuel vapor inlet and outlet in the first vent apparatus and the second vent apparatus includes a venting control module regulating flow of fuel vapor between the fuel vapor inlet and outlet in the second vent apparatus, the venting control module including a pressure-relief valve, a vacuum-relief valve, and a motion-actuated head valve on the vacuum-relief valve, and a second rollover valve assembly interconnecting the fuel vapor inlet in the second vent apparatus and an inlet formed in the venting control module.

9. A tank venting system comprising
   a tank formed to include an interior region, the tank including a top wall overlying a first portion of the interior region and a bottom wall underlying the top wall and defining a floor of the interior region,
   a vapor dome positioned to rise vertically above the top wall of the tank, the vapor dome being formed to include a vapor-receiving space overlying a second portion of the interior region of the tank adjacent to the first portion and communicating with the interior region of the tank to receive fuel vapor generated by liquid fuel contained in the interior region of the tank, the vapor dome including a raised top wall defining a ceiling of the vapor-receiving space and lying at a first elevation vertically above the top wall of the tank so that the top wall of the tank lies at a second elevation vertically above the bottom wall of the tank and vertically below the elevation of the raised top wall of the vapor dome, the vapor dome further including an inclined sidewall interconnecting the top wall of the tank and the raised top wall of the vapor dome, the inclined sidewall having a vertically lower edge appended to the top wall of the tank and a vertically higher edge appended to the raised top wall of the vapor dome,
   a first vent apparatus mounted on the top wall of the tank to vent the interior region of the tank,
   a second vent apparatus mounted on the raised top wall of the vapor dome to vent the vapor-receiving space of the vapor dome,
   a filler neck having a nozzle-receiving inlet, a fuel-discharging outlet coupled to the interior region of the tank, and a fill tube interconnecting the nozzle-receiving inlet and the fuel-discharging outlet, and
   a nozzle shut-off tube having an inlet end extending through the vapor space of the vapor dome and an outlet end coupled to the fill tube to communicate fuel vapor between the vapor space of the vapor dome and the fill tube of the filler neck until the inlet end of the nozzle shut-off tube is immersed in liquid fuel contained in the tank, wherein the inlet end of the nozzle shut-off tube terminates in the vapor-receiving space at an open-mouthed tip formed in the nozzle shut-off tube and positioned to intersect a reference plane defined by the top wall of the tank.

10. The system of claim 9, wherein the raised top wall of the vapor dome is formed to include an aperture receiving the inlet end of the nozzle shut-off tube.

11. A tank venting system comprising
    a tank formed to include an interior region, the tank including a top wall overlying a first portion of the interior region and a bottom wall underlying the top wall and defining a floor of the interior region,
    a vapor dome positioned to rise vertically above the top wall of the tank, the vapor dome being formed to include a vapor-receiving space overlying a second portion of the interior region of the tank adjacent to the first portion and communicating with the interior region of the tank to receive fuel vapor generated by liquid fuel contained in the interior region of the tank, the vapor dome including a raised top wall defining a ceiling of the vapor-receiving space and lying at a first elevation vertically above the top wall of the tank so that the top wall of the tank lies at a second elevation vertically above the bottom wall of the tank and vertically below the elevation of the raised top wall of the vapor dome,
    a first vent apparatus mounted on the top wall of the tank to vent the interior region of the tank,
    a second vent apparatus mounted on the raised top wall of the vapor dome to vent the vapor-receiving space of the vapor dome,
    a filler neck having a nozzle-receiving inlet, a fuel-discharging outlet coupled to the interior region of the tank, and a fill tube interconnecting the nozzle-receiving inlet and the fuel-discharging outlet, and
    a nozzle shut-off tube having an inlet end extending through the vapor space of the vapor dome and an outlet end coupled to the fill tube to communicate fuel vapor between the vapor space of the vapor dome and the fill tube of the filler neck until the inlet end of the nozzle shut-off tube is immersed in liquid fuel contained in the tank, wherein the inlet end of the nozzle shut-off tube terminates in the vapor-receiving space at an open-mouthed tip formed in the nozzle shut-off tube and positioned to intersect a reference plane defined by the top wall of the tank and the inlet end is also formed to include a side wall slot extending vertically upwardly from the open-mouthed tip to a point in the vapor-receiving space located between the open-mouthed tip and the raised top wall of the vapor dome.

12. A tank venting system comprising
    a tank formed to include an interior region, the tank including a top wall overlying a first portion of the interior region and a bottom wall underlying the top wall and defining a floor of the interior region,
    a vapor dome positioned to rise vertically above the top wall of the tank, the vapor dome being formed to include a vapor-receiving space overlying a second portion of the interior region of the tank adjacent to the first portion and communicating with the interior region of the tank to receive fuel vapor generated by liquid fuel contained in the interior region of the tank, the vapor dome including a raised top wall defining a ceiling of the vapor-receiving space and lying at a first elevation vertically above the top wall of the tank so that the top wall of the tank lies at a second elevation vertically above the bottom wall of the tank and vertically below the elevation of the raised top wall of the vapor dome,
    a first vent apparatus mounted on the top wall of the tank to vent the interior region of the tank,
    a second vent apparatus mounted on the raised top wall of the vapor dome to vent the vapor-receiving space of the vapor dome,
    a filler neck having a nozzle-receiving inlet, a fuel-discharging outlet coupled to the interior region of the tank, and a fill tube interconnecting the nozzle-receiving inlet and the fuel-discharging outlet,
    a nozzle shut-off tube having an inlet end extending through the vapor space of the vapor dome and an outlet end coupled to the fill tube to communicate fuel vapor between the vapor space of the vapor dome and the fill tube of the filler neck until the inlet end of the nozzle shut-off tube is immersed in liquid fuel contained in the tank, and
    a liquid fuel-actuated closure mechanism mounted to the nozzle shut-off tube and spring biased into a normally open position.

13. The system of claim 12, wherein the liquid fuel-actuated closure mechanism includes a float housing containing the inlet end of the nozzle shut-off tube, the float housing being formed to include a chamber communicating with the inlet end of the nozzle shut-off tube and an inlet aperture communicating liquid fuel and fuel vapor from the interior region of the tank into the chamber, a float valve positioned in the chamber for movement between an inlet end-opening position and an inlet end-closing position, and a spring biasing the float valve toward the inlet end-closing position.

14. A tank venting system comprising a tank formed to include an interior region, the tank including a top wall overlying a first portion of the interior region and a bottom wall underlying the top wall and defining a floor of the interior region, a vapor dome positioned to rise vertically above the top wall of the tank, the vapor dome being formed to include a vapor-receiving space overlying a second portion of the interior region of the tank adjacent to the first portion and communicating with the interior region of the tank to receive fuel vapor generated by liquid fuel contained in the interior region of the tank, the vapor dome including a raised top wall defining a ceiling of the vapor-receiving space and lying at a first elevation vertically above the top wall of the tank so that the top wall of the tank lies at a second elevation vertically above the bottom wall of the tank and vertically below the elevation of the raised top wall of the vapor dome, a first vent apparatus mounted on the top wall of the tank to vent the interior region of the tank, and a second vent apparatus mounted on the raised top wall of the vapor dome to vent the vapor-receiving space of the vapor dome, wherein the vapor dome includes an inclined side wall having a vertically lower edge appended to the top wall of the tank, a vertically higher edge appended to the raised top wall of the vapor dome, a first end edge between the lower and higher edges, and an opposite second end edge between the lower and higher edges, and a U-shaped side wall having a first end portion appended to the first end edge of the inclined side wall, a second end portion appended to the second end edge of the inclined side wall, a U-shaped upper perimeter edge appended to the raised top wall, and a U-shaped lower perimeter edge appended to the tank, wherein the tank further includes a first end, a filler neck coupled to the first end, an opposite second end lying in spaced-apart relation to the first end, a first side wall extending longitudinally between the first and second ends, the first side wall having one end lying close to the filler neck and extending vertically between the bottom wall and a portion of the U-shaped side wall of the vapor dome and another end lying away from the filler neck and extending vertically between the bottom and top walls of the tank, and a second side wall extending longitudinally between the first and second ends and lying in spaced-apart relation to the first side wall, the second side wall having one end lying close to the filler neck and extending between the bottom wall of the tank and another portion of the U-shaped side wall of the vapor dome and another end lying away from the filler neck and extending vertically between the bottom and top walls of the tank, the top wall of the tank is bisected longitudinally to define a first half section adjacent to the first side wall and a second half section adjacent to the second side wall, the raised top wall of the vapor dome is bisected longitudinally to define a first half portion in close proximity to the first side wall and a second half portion in close proximity to the second side wall, the first vent apparatus is mounted in an aperture formed in the first half portion of the top wall of the tank, and the second vent apparatus is mounted in an aperture formed in the second half portion of the raised top wall of the vapor dome so that the first and second vent apparatus lie in diagonally spaced-apart relation on opposite sides of a reference line longitudinally bisecting the top wall of the tank and longitudinally bisecting the raised top wall of the vapor dome.

15. A tank venting system comprising a tank formed to include an interior region, the tank including a top wall overlying a first portion of the interior region and a bottom wall underlying the top wall and defining a floor of the interior region, a vapor dome positioned to rise vertically above the top wall of the tank, the vapor dome being formed to include a vapor-receiving space overlying a second portion of the interior region of the tank adjacent to the first portion and communicating with the interior region for the tank to receive fuel vapor generated by liquid fuel contained in the interior region of the tank, the vapor dome including a raised top wall defining a ceiling of the vapor-receiving space and lying at a first elevation vertically above the top wall of the tank so that the top wall of the tank lies at a second elevation vertically above the bottom wall of the tank and vertically below the elevation of the raised top wall of the vapor dome, a tank venting apparatus coupled to the tank to vent the interior region of the tank, a dome-venting apparatus coupled to the vapor dome to vent the vapor-receiving space of the vapor dome, a filler neck having a nozzle-receiving inlet, a fuel-discharging outlet coupled to the interior region of the tank, and a fill tube interconnecting the nozzle-receiving inlet and the fuel-discharging outlet, a nozzle shut-off tube having an inlet end extending through the vapor space of the vapor dome and an outlet end coupled to the fill tube to communicate fuel vapor between the vapor space of the vapor dome and the fill tube of the filler neck until the inlet end of the nozzle shut-off tube is immersed in liquid fuel contained in the tank, and a liquid fuel-actuated closure mechanism mounted to the nozzle shut-off tube.

16. The system of claim 15, wherein the tank-venting apparatus includes a first housing mounted in an aperture formed in a wall of the tank, the first housing being formed to include a fuel vapor inlet located in the interior region of the tank and a fuel vapor outlet located outside the interior region of the tank, and a movable flow control valve positioned inside the first housing and arranged to regulate discharge of liquid fuel and fuel vapor from the interior region of the tank through the fuel vapor outlet.

17. The system of claim 16, wherein the dome-venting apparatus includes a second housing mounted in a wall of the vapor dome, the second housing being formed to include a fuel vapor inlet located in the vapor-receiving space of the vapor dome and a fuel vapor outlet located outside the vapor-receiving space of the vapor dome, and a flow control assembly positioned inside the second housing and arranged to regulate discharge of liquid fuel and fuel vapor from the vapor-receiving space of the vapor dome through the fuel vapor outlet of the second housing.

18. The system of claim 15, wherein the tank venting apparatus includes a fuel vapor inlet in the interior region of the tank and a fuel vapor outlet and the dome-venting apparatus includes a fuel vapor inlet in the vapor-receiving space of the vapor dome and a fuel vapor outlet, and further comprising a fuel vapor conduit interconnecting the fuel vapor outlets of the tank venting and dome-venting apparatus in fluid communication and conducting fuel vapor discharged from the tank venting and dome-venting apparatus toward a vapor-recovery canister.

19. The system of claim 18, wherein the tank venting apparatus includes a first rollover valve assembly interconnecting the fuel vapor inlet and outlet in the first vent apparatus and the dome-venting apparatus includes a venting control module regulating flow of fuel vapor between the fuel vapor inlet and outlet in the dome-venting apparatus, the venting control module including a pressure-relief valve, a vacuum-relief valve, and a motion-actuated head valve on the vacuum-relief valve, and a second rollover valve assembly interconnecting the fuel vapor inlet in the dome-venting apparatus and an inlet formed in the venting control module.

20. The system of claim 15, wherein the liquid fuel-actuated closure mechanism includes a float housing containing the inlet end of the nozzle shut-off tube, the float housing being formed to include a chamber communicating with the inlet end of the nozzle shut-off tube and an inlet aperture communicating liquid fuel and fuel vapor from the interior region of the tank into the chamber, a float valve positioned in the chamber for movement between an inlet end-opening position and an inlet end-closing position, and a spring biasing the float valve toward the inlet end-closing position.

21. A tank venting system comprising a tank formed to include an interior region, the tank including a top wall overlying a first portion of the interior region and a bottom wall underlying the top wall and defining a floor of the interior region, a vapor dome positioned to rise vertically above the top wall of the tank, the vapor dome being formed to include a vapor-receiving space overlying a second portion of the interior region of the tank adjacent to the first portion and communicating with the interior region for the tank to receive fuel vapor generated by liquid fuel contained in the interior region of the tank, the vapor dome including a raised top wall defining a ceiling of the vapor-receiving space and lying at a first elevation vertically above the top wall of the tank so that the top wall of the tank lies at a second elevation vertically above the bottom wall of the tank and vertically below the elevation of the raised top wall of the vapor dome, the vapor dome further including an inclined sidewall interconnecting the top wall of the tank and the raised top wall of the vapor dome, the inclined sidewall having a vertically lower edge appended to the top wall of the tank and a vertically higher edge appended to the raised top wall of the vapor dome, a tank venting apparatus coupled to the tank to vent the interior region of the tank, a dome-venting apparatus coupled to the vapor dome to vent the vapor-receiving space of the vapor dome, a filler neck having a nozzle-receiving inlet, a fuel-discharging outlet coupled to the interior region of the tank, and a fill tube interconnecting the nozzle-receiving inlet and the fuel-discharging outlet, and a nozzle shut-off tube having an inlet end extending through the vapor space of the vapor dome and an outlet end coupled to the fill tube to communicate fuel vapor between the vapor space of the vapor dome and the fill tube of the filler neck until the inlet end of the nozzle shut-off tube is immersed in liquid fuel contained in the tank, wherein the inlet end of the nozzle shut-off tube terminates in the vapor-receiving space at an open-mouthed tip formed in the nozzle shut-off tube and positioned to intersect a reference plane defined by the top wall of the tank.

22. A tank venting system comprising a tank formed to include an interior region, the tank including a top wall overlying a first portion of the interior region and a bottom wall underlying the top wall and defining a floor of the interior region, a vapor dome positioned to rise vertically above the top wall of the tank, the vapor dome being formed to include a vapor-receiving space overlying a second portion of the interior region of the tank adjacent to the first portion and communicating with the interior region for the tank to receive fuel vapor generated by liquid fuel contained in the interior region of the tank, the vapor dome including a raised top wall defining a ceiling of the vapor-receiving space and lying at a first elevation vertically above the top wall of the tank so that the top wall of the tank lies at a second elevation vertically above the bottom wall of the tank and vertically below the elevation of the raised top wall of the vapor dome, a tank venting apparatus coupled to the tank to vent the interior region of the tank, a dome-venting apparatus coupled to the vapor dome to vent the vapor-receiving space of the vapor dome, a filler neck having a nozzle-receiving inlet, a fuel-discharging outlet coupled to the interior region of the tank, and a fill tube interconnecting the nozzle-receiving inlet and the fuel-discharging outlet, and a nozzle shut-off tube having an inlet end extending through the vapor space of the vapor dome and an outlet end coupled to the fill tube to communicate-fuel vapor between the vapor space of the vapor dome and the fill tube of the filler neck until the inlet end of the nozzle shut-off tube is immersed in liquid fuel contained in the tank, wherein the inlet end of the nozzle shut-off tube terminates in the vapor-receiving space at an open-mouthed tip formed in the nozzle shut-off tube and positioned to intersect a reference plane defined by the top wall of the tank, wherein the inlet end is also formed to include a side wall slot extending vertically upwardly from the open-mouthed tip to a point in the vapor-receiving space located between the open-mouthed tip and the raised top wall of the vapor dome.

23. A tank venting system comprising a tank including a tiered top wall, a bottom wall underlying the tiered top wall, and an endless side wall interconnecting the tiered top wall and the bottom wall to define an interior region therebetween, the tiered top wall including a first tier at a first elevation above the bottom wall and a second tier at a second elevation above the bottom wall, the second elevation being greater in magnitude than the first elevation, the first tier including a left side half portion and a right side half portion, the second tier including a left side half portion lying in substantially side-by-side relation to the left side half portion of the first tier and in diagonally spaced-apart relation to the right side half portion of the first tier, the second tier further including a right side half portion lying in substantially side-by-side relation to the right side half portion of the first tier and in diagonally spaced-apart relation to the left side half portion of the first tier, a first vent apparatus mounted on the right side half portion of the first tier of the tiered top wall to vent the interior region of the tank, and a second vent apparatus mounted on the left side half portion of the second tier of the tiered top wall to vent the interior region of the tank.

24. The system of claim 23, further comprising a filler neck coupled to one portion of the endless side wall of the tank, the second tier of the tiered top wall being positioned to lie between the first tier of the tiered top wall and the filler neck.

25. The system of claim 24, further comprising a nozzle shut-off tube extending into the interior region through an aperture formed in the tank and interconnecting the interior region of the tank and filler neck in fluid communication.

26. The system of claim 25, wherein the second tier of the tiered top wall is formed to include an aperture receiving the nozzle shut-off tube therein.

27. The tank venting system of claim 23, wherein the first vent apparatus includes a vent housing mounted in an aperture formed in the right side half portion of the first tier of the tiered top wall.

28. The tank venting system of claim 27, wherein the first vent apparatus further includes a rollover valve mounted for movement in the vent housing.

29. The tank venting system of claim 23, wherein the second vent apparatus includes a vent housing mounted in an aperture formed in the left side half portion of the second tier of the tiered top wall.

30. The tank venting system of claim 29, wherein the second vent apparatus further includes a tank pressure-relief valve in the vent housing.

31. The tank venting system of claim 30, wherein the second vent apparatus further includes a vacuum-relief valve in the vent housing.

32. The tank venting system of claim 30, wherein the second vent apparatus further includes a motion-actuated head valve in the vent housing.

33. A tank venting system comprising a fuel tank unit formed to include an interior region having a predetermined liquid fuel capacity, a first vent apparatus coupled to the fuel tank unit to vent the interior region, a second vent apparatus coupled to the fuel tank unit to vent the interior region, the second vent apparatus including a housing having an inlet and an outlet and a flow control assembly positioned for movement in the housing to regulate discharge of fuel vapor admitted into the housing via the inlet and from the housing via the outlet, means for blocking flow of pressurized fuel vapor from the interior region of the fuel tank unit through the first vent apparatus once the volume of liquid fuel in the interior region of the fuel tank unit is at least 90% of the predetermined liquid fuel capacity of the interior region of the fuel tank unit so that any further venting of pressurized fuel vapor from the interior region of the fuel tank unit is regulated by movement of the flow control assembly in the housing Of the second vent apparatus, a filler neck coupled to the fuel tank unit, and a nozzle shut-off tube extending into the interior region of the fuel tank unit through an aperture formed in the fuel tank unit, the nozzle shut-off tube having an inlet positioned to be closed by liquid fuel in the interior region of the fuel tank unit once the volume of liquid fuel in the interior region of the fuel tank unit is greater than 90% of the predetermined liquid fuel capacity of the interior region of the fuel tank unit.

34. A tank venting system comprising a fuel tank unit formed to include an interior region having a predetermined liquid fuel capacity, a first vent apparatus coupled to the fuel tank unit to vent the interior region, a second vent apparatus coupled to the fuel tank unit to-vent the interior region, the second vent apparatus including a housing having an inlet and an outlet and a flow control assembly positioned for movement in the housing to regulate discharge of fuel vapor admitted into the housing via the inlet and from the housing via the outlet, means for blocking flow of pressurized fuel vapor from the interior region of the fuel tank unit through the first vent apparatus once the volume of liquid fuel in the interior region of the fuel tank unit is at least 90% of the predetermined liquid fuel capacity of the interior region of the fuel tank unit so that any further venting of pressurized fuel vapor from the interior region of the fuel tank unit is regulated by movement of the flow control assembly in the housing of the second vent apparatus, wherein the fuel tank unit includes a tiered top wall, a bottom wall underlying the tiered top wall, and an endless side wall interconnecting the tiered top wall and the bottom wall to define an interior region therebetween, the tiered top wall includes a first tier at a first elevation above the bottom wall and a second tier at a second elevation above the bottom wall, the second elevation is greater in magnitude than the first elevation, the first vent apparatus is mounted on the first tier of the tiered top wall to vent the interior region of the fuel tank unit, and a second vent apparatus is mounted on the second tier of the tiered top wall to vent the interior region of the fuel tank unit.

35. The system of claim 34, further comprising a filler neck coupled to one portion of the endless side wall of the tank, the second tier of the tiered top wall being positioned to lie between the first tier of the tiered top wall and the filler neck, and a nozzle shut-off tube extending into the interior region through an aperture formed in the fuel tank unit and interconnecting the interior region of the fuel tank unit and filler neck in fluid communication.

36. The system of claim 35, wherein the second tier of the tiered top wall is formed to include an aperture receiving the nozzle shut-off tube therein.

37. The tank venting system of claim 34, wherein the first vent apparatus includes a vent housing mounted in an aperture formed in the first tier of the tiered top wall and a rollover valve mounted for movement in the vent housing.

38. The tank venting system of claim 34, wherein the second vent apparatus includes a vent housing mounted in an aperture formed in the second tier of the tiered top wall and a tank pressure-relief valve in the vent housing.

39. The tank venting system of claim 38, wherein the second vent apparatus further includes a vacuum-relief vale in the vent housing.

40. The tank venting system of claim 38, wherein the second vent apparatus further includes a motion-actuated head valve in the vent housing.

* * * * *